United States Patent
Thomas

(10) Patent No.: US 10,538,260 B2
(45) Date of Patent: Jan. 21, 2020

(54) SYSTEM FOR CONVERTING A DOOR TO A CART

(71) Applicant: Exit Gear, LLC, Richland, WA (US)

(72) Inventor: Kyle Jay Thomas, Richland, WA (US)

(73) Assignee: Exit Gear, LLC, Richland, WA (US)

( * ) Notice: Subject to any disclaimer, the term of this patent is extended or adjusted under 35 U.S.C. 154(b) by 0 days.

(21) Appl. No.: 15/444,149

(22) Filed: Feb. 27, 2017

(65) Prior Publication Data

US 2018/0065651 A1    Mar. 8, 2018

Related U.S. Application Data

(60) Provisional application No. 62/383,003, filed on Sep. 2, 2016.

(51) Int. Cl.
*B62B 1/12* (2006.01)
*B62B 5/06* (2006.01)
*B62B 13/00* (2006.01)
*B61D 15/00* (2006.01)

(52) U.S. Cl.
CPC ............... *B62B 1/12* (2013.01); *B61D 15/00* (2013.01); *B62B 5/06* (2013.01); *B62B 13/00* (2013.01); *B62B 2205/006* (2013.01); *B62B 2205/104* (2013.01); *B62B 2206/006* (2013.01)

(58) Field of Classification Search
None
See application file for complete search history.

(56) References Cited

U.S. PATENT DOCUMENTS

| | | | | |
|---|---|---|---|---|
| 669,222 A | * | 3/1901 | Ruher | B62B 1/02 280/40 |
| 1,182,876 A | | 5/1916 | Lieskovan | |
| 2,464,525 A | * | 3/1949 | Nurney | B60P 3/1033 280/42 |
| 2,636,748 A | * | 4/1953 | Giovannoni | B62B 1/18 280/47.3 |
| 2,775,465 A | * | 12/1956 | Swingler | B62B 1/18 280/47.2 |
| 3,170,708 A | * | 2/1965 | Miller | B62B 5/0083 24/525 |
| 3,222,100 A | * | 12/1965 | Lindzy | A61G 1/007 280/23.1 |

(Continued)

FOREIGN PATENT DOCUMENTS

| | | | | |
|---|---|---|---|---|
| CN | 204184386 U | | 3/2015 | |
| GB | 179473 A | * | 5/1922 | ........... B62B 5/0083 |

(Continued)

*Primary Examiner* — Katy M Ebner
(74) *Attorney, Agent, or Firm* — Kolisch Hartwell, P.C.

(57) ABSTRACT

A cart may include a door forming a bed of the cart and a pair of wheel attachment assemblies. Each wheel attachment assembly may include (a) a fender having a planar expanse configured to abut a lower major face of the door, (b) a clamping member coupled to the fender, the clamping member configured to be coupled to an upper major face of the door and abut an edge face of the door, and (c) a wheel fork coupled to the fender and configured to be coupled to an axle of a wheel. The cart may include a handle clamp configured to be coupled to an edge portion of the planar member and a handle configured to be coupled to the handle clamp.

20 Claims, 12 Drawing Sheets

(56) References Cited

U.S. PATENT DOCUMENTS

| | | | | |
|---|---|---|---|---|
| 3,298,704 A * | 1/1967 | Dewers | ............... | B62B 5/0083 280/35 |
| 4,049,283 A * | 9/1977 | Brookes | ............... | B62B 5/0083 182/127 |
| 5,267,744 A * | 12/1993 | Berry | ............... | B62B 7/04 280/204 |
| 5,356,164 A * | 10/1994 | Miller | ............... | B62B 5/0083 269/17 |
| 5,884,920 A * | 3/1999 | Seto | ............... | B62B 7/02 280/1.5 |
| 5,887,879 A * | 3/1999 | Chumley | ............... | B62B 1/125 280/40 |
| 6,142,491 A * | 11/2000 | Darling, III | ............... | B62B 5/0023 224/627 |
| 6,449,801 B1 * | 9/2002 | Durrin | ............... | B60B 33/0002 16/29 |
| 6,561,529 B2 * | 5/2003 | Darling, III | ............... | B62B 1/002 280/79.2 |
| 6,592,134 B2 * | 7/2003 | Abraham | ............... | B62B 5/0083 16/29 |
| 6,688,635 B1 * | 2/2004 | Watts | ............... | B62B 1/206 280/47.24 |
| 6,811,179 B2 * | 11/2004 | Woods | ............... | B62B 1/206 280/63 |
| 6,991,250 B2 * | 1/2006 | Lindsey | ............... | B62B 1/12 280/30 |
| 7,448,632 B1 * | 11/2008 | Nieto | ............... | B62B 1/006 280/47.18 |
| 7,963,531 B2 * | 6/2011 | Panigot | ............... | A47C 1/143 280/38 |
| 8,002,291 B1 * | 8/2011 | Sandoval | ............... | B62B 5/0083 280/205 |
| 8,714,570 B2 * | 5/2014 | Skijus | ............... | B60N 3/026 16/422 |
| 8,899,599 B2 * | 12/2014 | Whitefield | ............... | B62B 5/0083 280/35 |
| 8,910,956 B2 * | 12/2014 | Bengtzen | ............... | A45C 5/14 220/4.24 |
| 9,623,924 B2 * | 4/2017 | Huskey | ............... | B62D 63/062 |
| 2003/0080538 A1 * | 5/2003 | Watts | ............... | B62B 1/206 280/652 |
| 2003/0214107 A1 * | 11/2003 | Fernandez | ............... | A47B 95/02 280/47.371 |
| 2007/0029747 A1 * | 2/2007 | Islo | ............... | B60F 3/0069 280/47.35 |
| 2009/0101437 A1 * | 4/2009 | Abraham | ............... | B62B 5/0083 182/129 |
| 2010/0058555 A1 * | 3/2010 | Dube | ............... | B62B 1/20 16/110.1 |
| 2013/0181471 A1 * | 7/2013 | Tucker | ............... | A61G 1/02 296/20 |
| 2017/0318799 A1 * | 11/2017 | Stilwell | ............... | A01M 31/00 |

FOREIGN PATENT DOCUMENTS

| | | |
|---|---|---|
| GB | 2516525 A | 1/2015 |
| GB | 2516525 B | 7/2015 |
| KR | 1020120026175 A | 3/2012 |
| KR | 101200369 B1 | 11/2012 |

* cited by examiner

SYSTEM FOR CONVERTING A DOOR TO A CART

CROSS-REFERENCE

This application claims priority from U.S. Provisional Patent Application Ser. No. 62/383,003 filed Sep. 2, 2016, all of which is incorporated herein, in its entirety, for all purposes.

FIELD

This disclosure relates generally to systems, methods, and apparatus for converting a door into a movable cart.

INTRODUCTION

In the event of a disaster, access to fuel for vehicles may be limited. It may also be the case that other transportation infrastructure is nonfunctional. In such an event it may be a challenge to transport one or more people, such as a family, along with any necessary gear, food or water, over distances of several to hundreds of miles. In some cases, people may wish to travel along existing roads, across country without using paved roads, along railroad tracks, over snow, or any combination of these. Few, if any, carts are so versatile as to accommodate all of these forms of travel. Few carts, if any, are also capable of traveling over such diverse terrain while also being compact and easily stowable when not in use.

SUMMARY

In some embodiments, a kit for converting a door into a cart may include a pair of wheel attachment assemblies. Each wheel attachment assembly may include a fender having a planar expanse with a first portion of the planar expanse configured to abut an under side of a door when the door is in a non-vertical orientation and a second portion of the planar expanse configured to extend beyond a lateral edge of the door. Each wheel attachment assembly may further include a clamping member coupled to the fender, with the clamping member having an upper portion configured to be coupled to a top side of the door when the door is in a non-vertical orientation and a side portion configured to abut the lateral edge of the door. Each wheel attachment assembly may include an inner fork arm coupled to the first portion of the planar expanse of the fender and an outer fork arm coupled to the second portion of the planar expanse of the fender. Each wheel attachment assembly may include an inner wheel attachment member coupled to the inner fork arm proximate a bottom end of the inner fork arm, and an outer wheel attachment member coupled to the outer fork arm proximate a bottom end of the outer fork arm. A channel between the clamping member and the fender may be sized to receive an edge portion of a door. The inner and outer wheel attachment members may each be configured to receive an axle of a bicycle wheel.

In some examples, a method of converting a door into a bed of a cart may include removing a door from a doorway and coupling a pair of wheel attachment assemblies to the door. Each wheel attachment assembly may include a clamp portion configured to couple the wheel attachment assembly to an edge portion of a door and a fork configured to be coupled to a wheel. The method may include coupling a pair of wheels to the pair of wheel attachment assemblies and coupling a handle to the door.

In some embodiments, a cart may include a planar member having a lower major face, an upper major face, and an edge face extending from the lower major face to the upper major face. The planar member may form a bed of the cart. The cart may include a pair of wheel attachment assemblies. Each wheel attachment assembly may include a fender having a planar expanse with a first portion of the planar expanse configured to abut the lower major face of the planar member when the planar member is in a non-vertical orientation and a second portion of the planar expanse configured to extend beyond a lateral edge of the planar member. Each wheel attachment assembly may include a clamping member coupled to the fender, with the clamping member configured to (a) be coupled to the upper major face of the planar member when the planar member is in a non-vertical orientation and (b) abut the edge face of the planar member. Each wheel attachment assembly may include a wheel fork coupled to the fender and configured to be coupled to an axle of a wheel. The cart may include a handle clamp configured to be coupled to an edge portion of the planar member and a handle configured to be coupled to the handle clamp. The cart may include a stabilizer bar spaced from the planar member and extending between the wheel forks of the pair of wheel attachment assemblies.

Features, functions, and advantages may be achieved independently in various embodiments of the present disclosure, or may be combined in yet other embodiments, further details of which can be seen with reference to the following description and drawings.

DESCRIPTION

Overview

Various embodiments of an exit door evacuation cart having a pair of wheel attachment assemblies configured to be coupled to a variety of different wheels are described below and illustrated in the associated drawings. Unless otherwise specified, the exit door evacuation cart and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar carts. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

EXAMPLES, COMPONENTS, AND ALTERNATIVES

The following sections describe selected aspects of exemplary carts as well as related systems and/or methods. The examples in these sections are intended for illustration and should not be interpreted as limiting the entire scope of the present disclosure. Each section may include one or more distinct inventions, and/or contextual or related information, function, and/or structure.

Example 1

This example describes an illustrative cart, and an illustrative kit for converting a door into a cart; see FIGS. 1-11.

Figure 1:
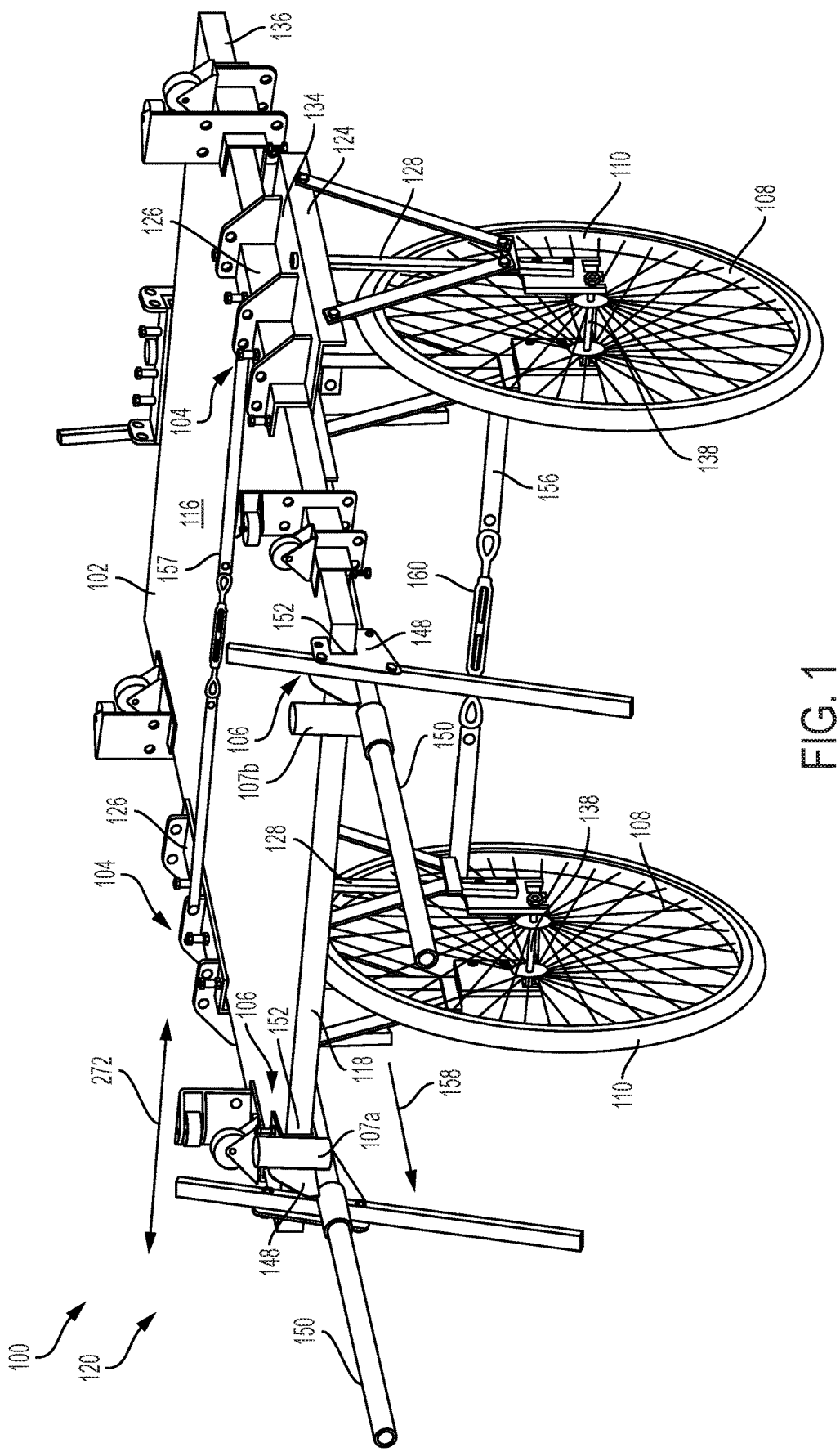
FIG. 1 is an upper isometric view of a cart, showing a pair of wheel attachment assemblies coupled to a pair of bicycles wheels and a first set of topside railroad rail wheel assemblies.
Figure 2:
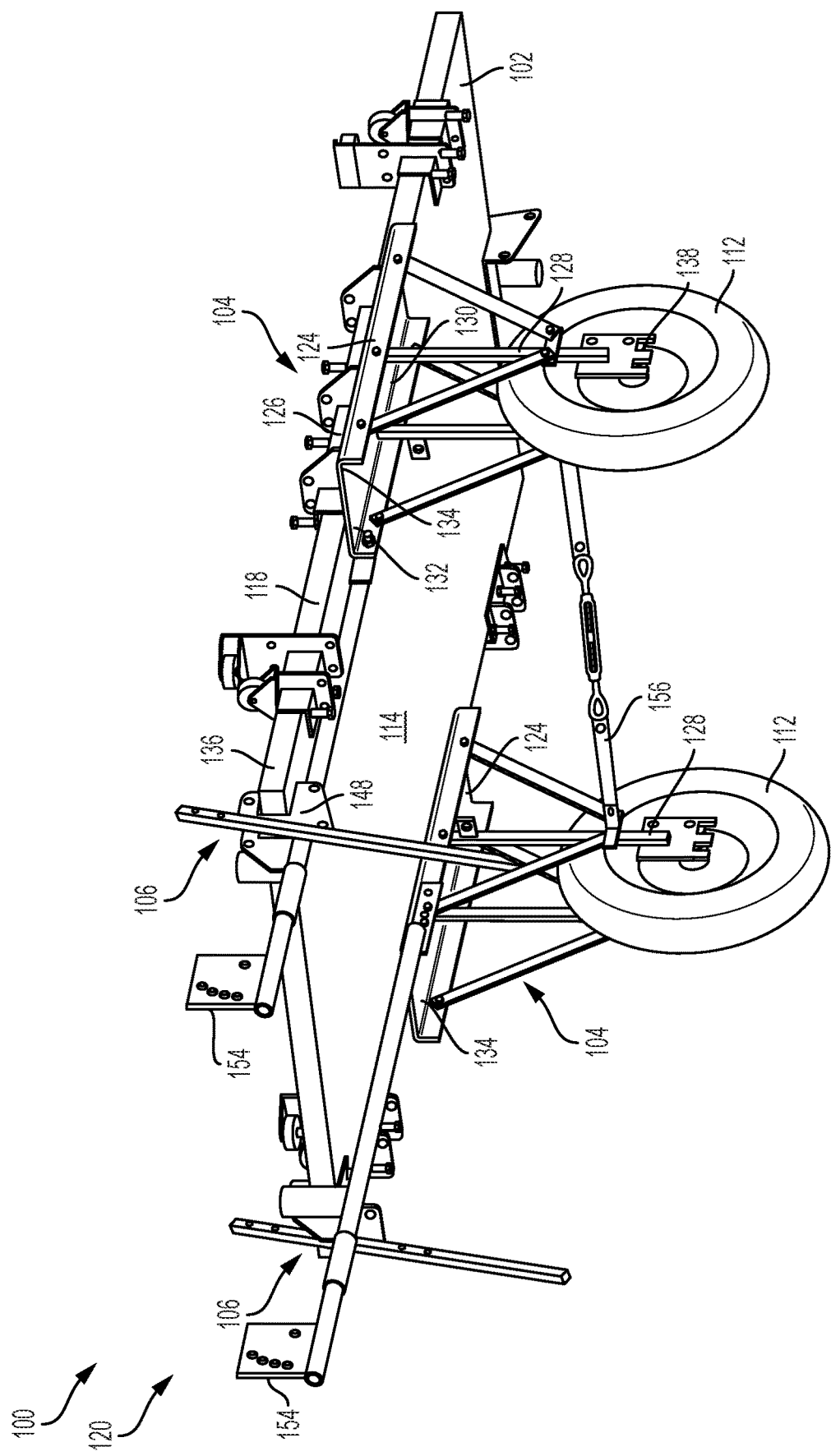
FIG. 2 is a lower isometric view of the cart of FIG. 1, showing the pair of wheel attachment assemblies coupled to a pair of wheel barrow wheels.
Figure 3:
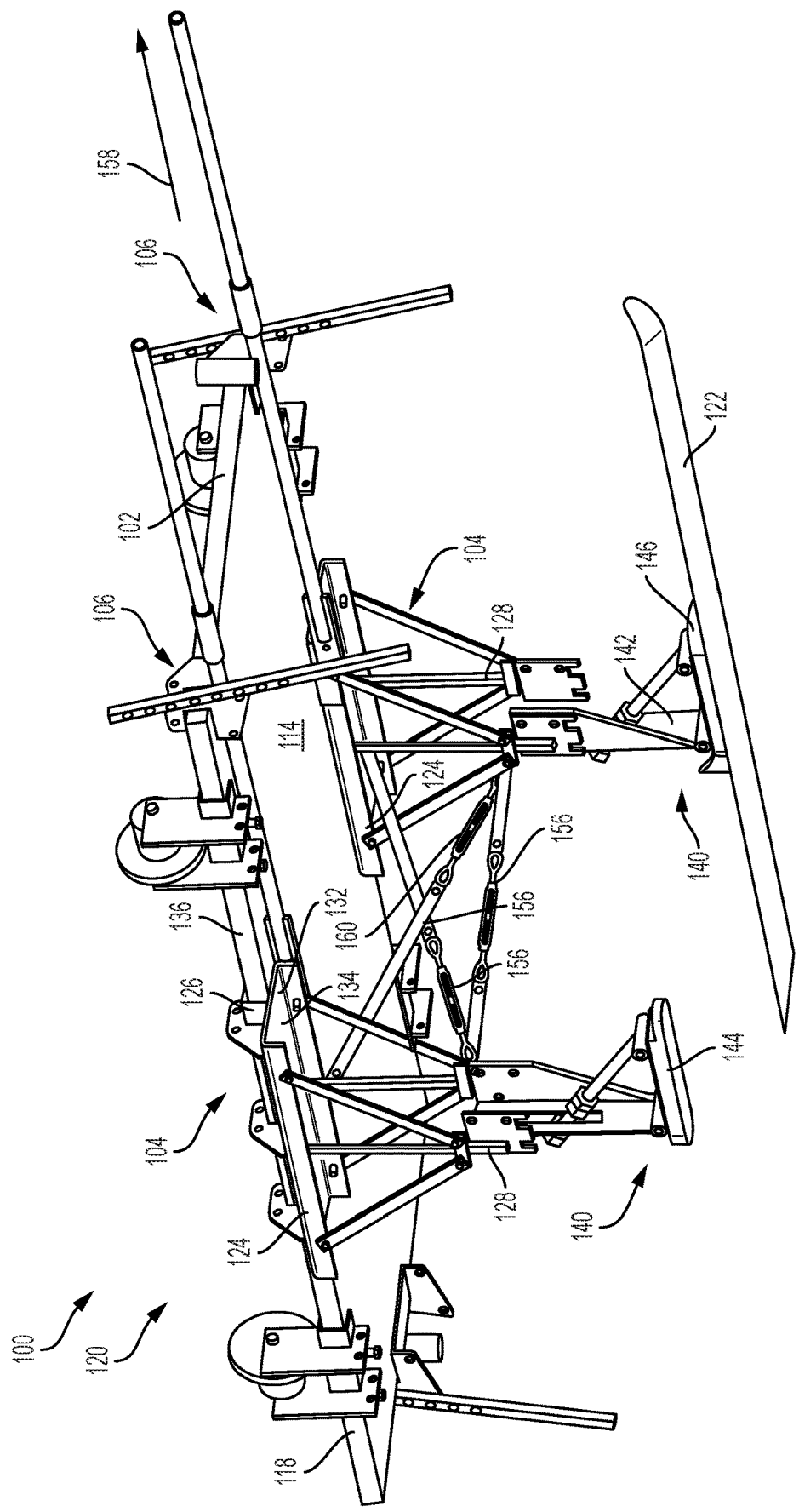
FIG. 3 is a lower isometric view of the cart of FIG. 1, showing a pair of ski attachment assemblies coupled to the pair of wheel attachment assemblies, a ski coupled to one of the ski attachment assemblies, and a second set of topside railroad rail wheel assemblies.

FIG. 1 is an upper isometric view of a cart, generally indicated at 100. FIG. 2 is a lower isometric view of cart 100, and FIG. 3 is another lower isometric view of cart 100. FIGS. 1-3 are herein described together. Cart 100 may be adaptable and able to be configured to be supported by a variety of wheels and/or other objects such as skis.

Cart 100 may include a planar member 102, a pair of wheel attachment assemblies 104, and one or more handle attachment assemblies 106. The planar member may form a bed of the cart. The pair of wheel attachment assemblies may be configured to couple a pair of wheels 108, for example a pair of bicycle wheels 110 shown in FIG. 1 or a pair of wheelbarrow wheels 112 shown in FIG. 2, to planar member 102. The pair of wheel attachment assemblies may be configured to be coupled and decoupled, perhaps repeatably, from the planar member. The handle attachment assemblies 106 may be configured to allow a user to push or pull cart 100 and thereby move the cart. The pair of handle attachment assemblies 106 may be configured to be coupled and decoupled, perhaps repeatably, from the planar member.

Planar member 102 may have a lower major face 114, an upper major face 116, and an edge face 118 extending from the lower major face to the upper major face. Lower major face 114 may be an under side of planar member 102 and upper major face 116 may be a top side of the planar member. Planar member 102 may be formed of any appropriate material or combination of materials, such as wood, fiberglass, plastic, or metal, etc., and/or the like. Planar member 102 may have any appropriate dimensions in order to support an amount of gear and supplies for an individual or a group of people.

In some examples, planar member 102 may be a door, such as an interior door or an exterior door. The door may have been removed from a door frame or may have not been in use as a door prior to incorporation into cart 100. In some examples, planar member 102 may include a piece of plywood or multiple pieces of plywood stacked on top of one another. In some examples, planar member 102 may include a box spring of a bed or some other component of a bed frame.

Elements or components of cart 100, excluding planar member 102, may be considered to be elements or components of a kit 120 for converting the planar member into a cart. In some examples, the pair of wheels 108 may be included with kit 120, while in other examples, the pair of wheels may be excluded from kit 120. Many people have at least one bicycle at their house and also usually at least one door. Such a person could use kit 120 to convert a door into cart 100 by attaching the pair of wheel attachment assemblies 104 to the door, attaching one or more of the handle attachment assemblies 106 to the door, and attaching the pair of bicycle wheels 110 from their bicycle to the pair of wheel attachment assemblies. Prior to attachment to the planar member and the pair of wheels, kit 120 may be configured to be disassembled and may take up a relatively small amount of space.

In some examples, see for instance in FIG. 3, kit 120 may be configured to convert planar member 102 into cart 100, with cart 100 capable of traveling over snow and/or ice via a pair of skis 122. Many people have at least one pair of skis in their house and for these people, kit 120 may be easily stowed or stored in a compact, disassembled configuration without including the planar member or the pair of skis.

In some examples, the pair of wheel attachment assemblies 104 may be substantially identical to one another. In some examples, the pair of wheel attachment assemblies may be substantially mirror images of one another across a vertical plane bisecting cart 100 along a long direction of planar member 102. Each wheel attachment assembly of the pair of wheel attachment assemblies may include a fender 124, a clamping member 126, and a wheel fork 128.

Fender 124 may have a planar expanse 130. That is, at least a portion of fender 124, namely planar expanse 130, may be substantially flat or planar. This may be in contrast to a general impression of a fender of a car or a bicycle as being a curved surface that partially covers a wheel. However, as can be seen in FIGS. 1 and 2, each fender 124 does partially cover one of the pair of wheels 108. Configuring fender 124 to at least partially include planar expanse 130 may facilitate coupling wheel attachment assembly 140 to planar member 102, which may itself be substantially flat or planar.

Planar expanse 130 may have a first portion 132 and a second portion 134, with the first portion configured to abut lower major face 114 of planar member 102 when the planar member is in a non-vertical orientation and the second portion 134 configured to extend beyond a lateral edge 136 of the planar member. The first portion may be considered an inboard portion of the planar expanse, while the second portion may be considered an outboard portion, with inboard and outboard being relative to cart 100.

Clamping member 126 may be coupled to fender 124. Clamping member 126 may be configured to be coupled to the upper major face 116 of planar member 102 when the planar member is in a non-vertical orientation. The clamping member may be configured to abut the edge face 118 of the planar member.

Wheel fork 128 may be coupled to fender 124 and may be configured to be coupled to an axle 138 of wheel 108. In some examples, wheel fork 128 may be configured to be coupled to a ski attachment assembly 140, best seen in FIG. 3. Ski attachment assembly 140 may include a leg member 142 and a boot member 144. Wheel attachment assembly 104 may be configured to be coupled to the leg member of the ski attachment assembly. Ski 122 may be configured to be coupled to the boot member 144, perhaps with boot member 144 engaging a boot binding 146 of the ski.

Each handle attachment assembly 106 may include a handle clamp 148 and a handle 150. Handle clamp 148 may be configured to be coupled to an edge portion 152 of the planar member. Edge portion 152 may include a portion of edge face 118, a portion of upper major face 116 proximate the edge face, and a portion of lower major face 114 proximate the edge face. Handle 150 may be configured to be coupled to handle clamp 148, and may include quick release locking pin 151. In some examples, handle attachment assembly 106 may include a towing plate 154, best seen in FIG. 2, coupled to the handle clamp in place of handle 150. Towing plate 154 may be configured so that the handle clamp can be configured to be coupled to a car attachment assembly.

Handle attachment assembly 106 may be one of a pair of handle attachment assemblies. Each handle attachment assembly may be configured to be coupled to the edge portion 150 of the planar member at spaced apart locations around lateral edge 136 of the planar member. In some examples, the pair of handle attachment assemblies may be identical to one another. In some examples, the pair of handle attachment assemblies may be mirror images of one another. As shown in FIG. 1, handle attachment assembly 106 may also include a "broom stick" holder or receiver 107a for receiving in a substantially vertical orientation a broom or shovel handle, or any other rigid elongate stick or rod. An elongate stick or handle may be clamped in one of the holders 107a, 107b to convert the cart into a rigid table or working surface. A vertically clamped stick or handle also stabilizes the cart when loading. When the cart is fully loaded, the handle may be unclamped and removed so the cart is ready for travel.

Figure 4:
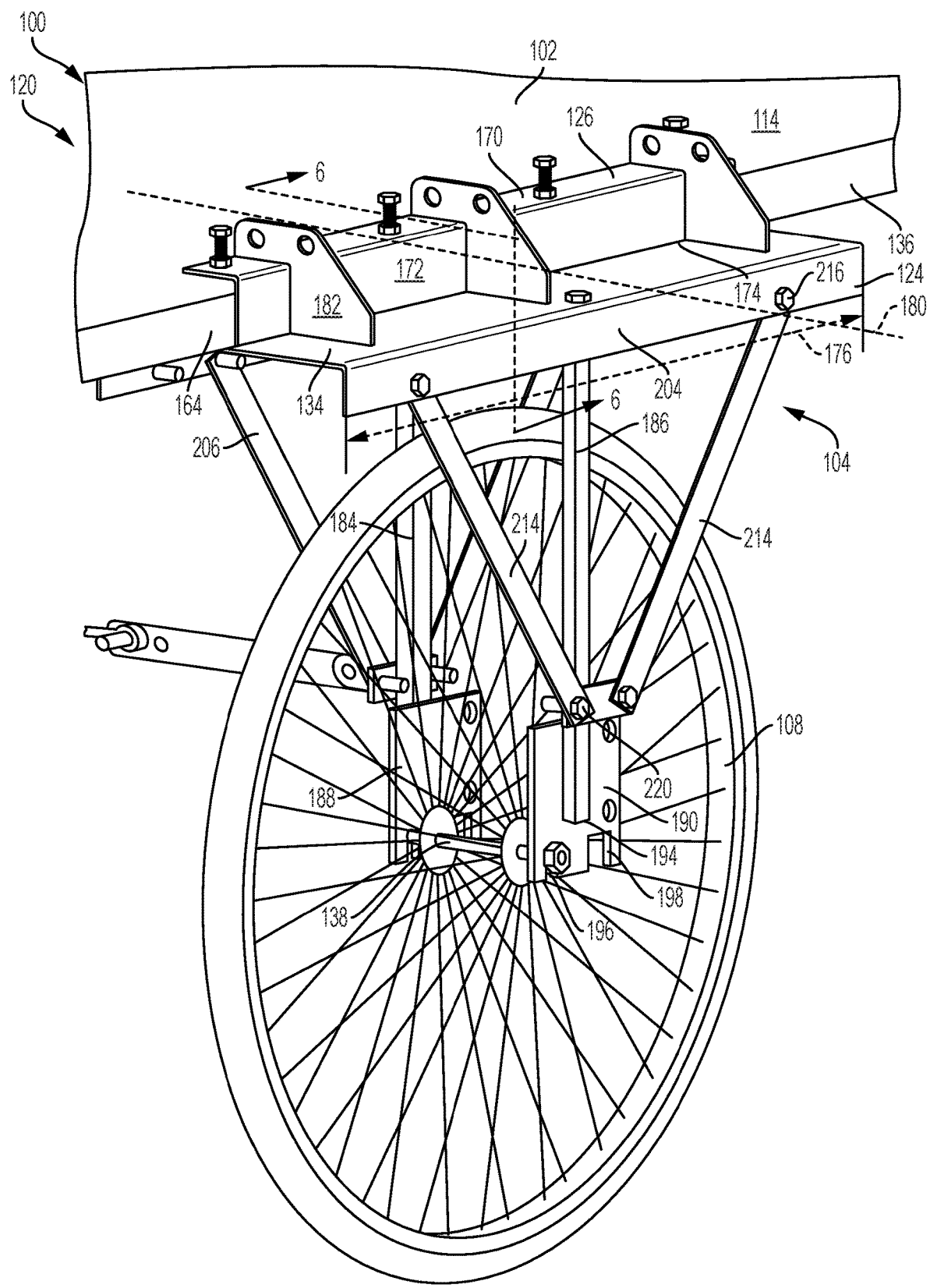
FIG. 4 is a detailed view of the outboard side of one of the wheel attachment assemblies of the cart of FIG. 1, showing the wheel attachment assembly coupled to an edge portion of a planar member such as a door.
Figure 5:
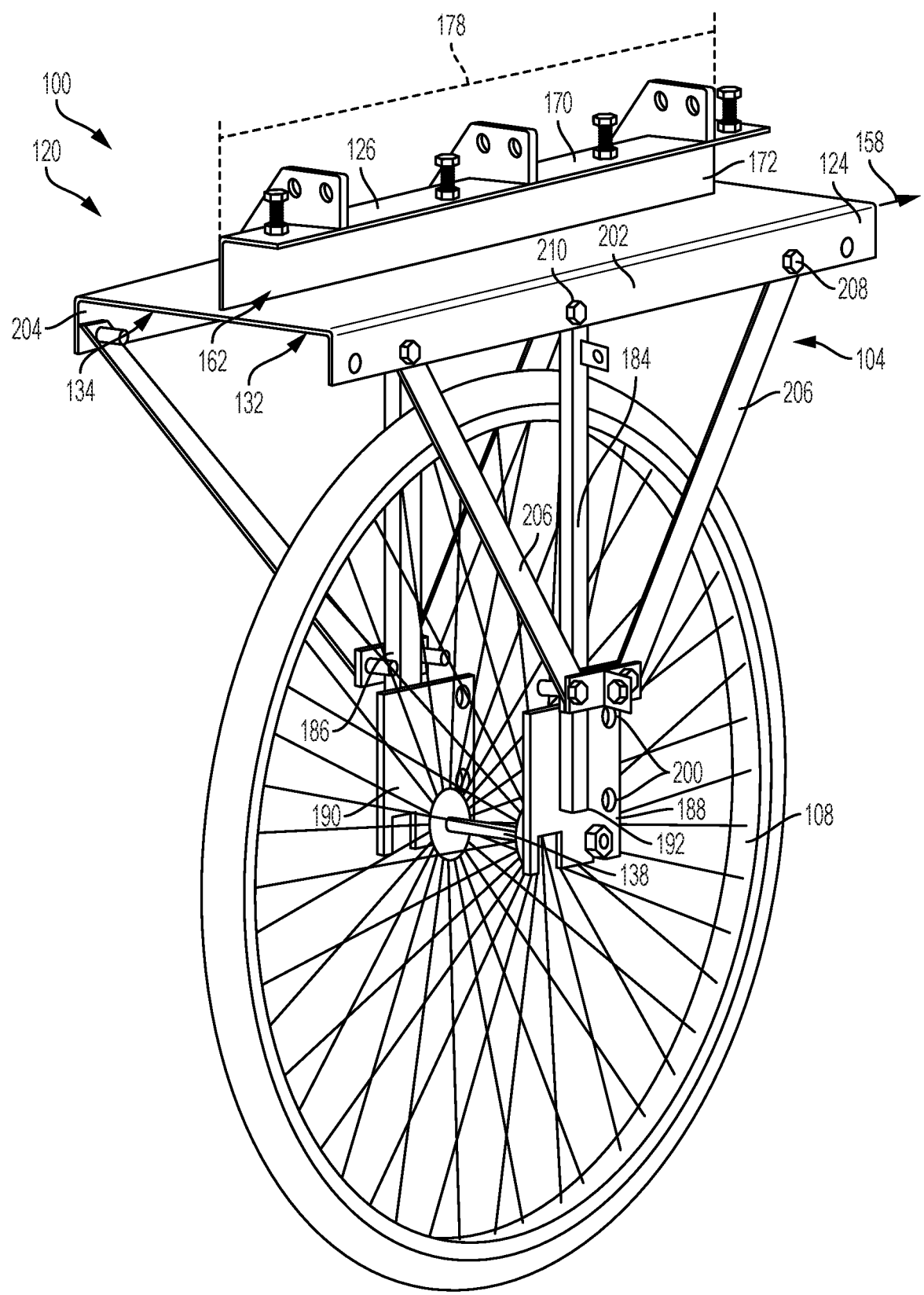
FIG. 5 is a detailed view of the inboard side of one of the wheel attachment assemblies of the cart of FIG. 1.
Figure 6:
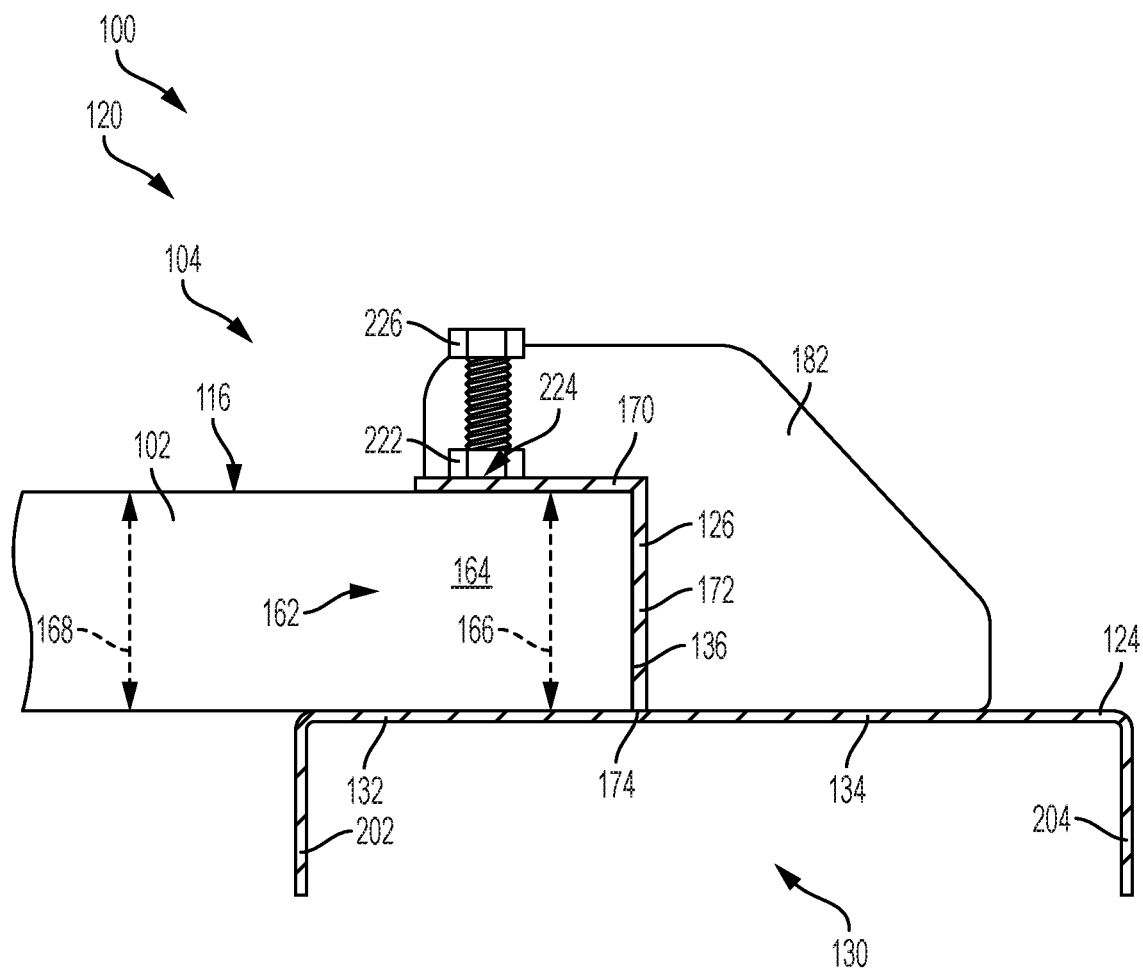
FIG. 6 is a cross-sectional view, taken at 6-6 in FIG. 4, of a fender and a clamping member of the wheel attachment assembly, showing an edge portion of the planar member received within a channel between the clamping member and the fender.

Cart 100 may include one or more stabilizer bars 156 configured to provide cart 100 with stability in a direction perpendicular to a primary direction of travel, indicated by arrow 158, of the cart. The stabilizer bars may be spaced from planar member 102 and may extend between respective wheel forks 128 of the pair of wheel attachment assemblies 104. Stabilizer bar 156 may include a turnbuckle 160 so that tension in the stabilizer bar may be adjusted. Turnbuckle 160 also allows for adjustment and tightening the wheel assemblies together for accommodating different door (plane) widths. Turnbuckle assembly 157 may also be used to secure the fender assemblies. FIG. 4 is a detailed view of the outboard side of one of the wheel attachment assemblies 104 of cart 100 and/or kit 120. FIG. 5 is a detailed view of the inboard side of the wheel attachment member. FIG. 6 is a cross-sectional view, taken at 6-6 in FIG. 4, of fender 124 and clamping member 126 of the wheel attachment assembly. FIGS. 4-6 are herein described together.

Clamping member 126 and fender 124 may define a channel 162 therebetween, and channel 162 may be sized to receive an edge portion 164 of planar member 102. In examples where planar member 102 is a door, the channel may have a width 166 which is greater than or equal to a thickness 168 of the door. In some embodiments, width 166 may be greater than or equal to 1¾ inches. In some embodiments, width 166 may be approximately 2 inches.

Clamping member 126 may have an upper portion 170 configured to be coupled to a top side 116 of planar member 102 when the planar member in in a non-vertical orientation and a side portion 172 configured to abut the lateral edge 136 of the door. In some examples, clamping member 126 may be an angle iron and the angle iron may be coupled to the fender along a long edge 174 of the angle iron. Clamping member 126 may, for example, be welded to fender 124.

Upper portion 170 of clamping member 126 may be one of the flanges of an angle iron and side portion 172 of the clamping member may be the other of the flanges of the angle iron. Upper portion 170 may have a width of approximately 2 inches and side portion 172 may have a width of approximately 2 inches. Each of the upper and side portions may be approximately ⅛ inch thick.

Fender 124 and/or clamping member 126 may have a sufficient length to ensure that wheel attachment assembly 104 does not rotate relative to planar member 102. In particular fender 124 may have a length 176 and clamping member 126 may have a length 178 configured so that wheel attachment assembly 104 does not rotate around a lateral rotation axis 180 which is horizontal and perpendicular to direction of travel 158. In some examples, fender 124 may have a length in a range of one to three feet, such as approximately two feet. In some examples, clamping member 126 may have a length in a range of one to three feet, such as approximately two feet or one foot, eleven inches.

Wheel attachment assembly 104 may include a gusset 182 configured to stabilize clamping member 126 relative to fender 124. In some examples, gusset 182 may be one of a plurality of gussets, and each of the plurality of gussets may be coupled to fender 124, side portion 172 of the clamping member and upper portion 170 of the clamping member. The one or more gussets 182 may be coupled to fender 124 proximate second portion 134 of planar expanse 130 of the fender. Gusset(s) 182 may be welded to one or both of the clamping member and the fender.

Wheel attachment assembly 104 and/or wheel fork 128 may include an inner fork arm 184 and an outer fork arm 186. Inner fork arm 184 may be coupled to first portion 132 of planar expanse 130 of fender 124 and outer fork arm 186 may be coupled to second portion 134 of the planar expanse of the fender. The inner fork arm and outer fork arm may be coupled to the fender by any appropriate means, for example, via welding, bolts, screws, rivets, etc., and/or the like.

In some examples, inner fork arm 184 and outer fork arm 186 may be configured to be directly coupled to axle 138 of wheel 108. In some examples, the inner and outer fork arms may be coupled to the axle via an inner wheel attachment member 188 and an outer wheel attachment member 190, respectively. The inner wheel attachment member 188 may be coupled to the inner fork arm proximate a bottom end 192 of the inner fork arm. The outer wheel attachment member 190 may be coupled to the outer fork arm proximate a bottom end 194 of the outer fork arm. The inner and outer wheel attachment members may be each configured to receive an axle of wheel 108.

One or both of the inner and outer wheel attachment members 188 and 190 may be configured to be coupled to an axle of a bicycle wheel, an axle of a wheelbarrow wheel, an axle of a motorcycle wheel, or any other appropriate wheel. One or both of the inner and outer wheel attachment members may include one or more slots and/or one or more apertures. One or both of the inner and outer wheel attachment members may include any of a narrow slot 196 for receiving an axle of a bicycle wheel, a wide slot 198 for receiving an axle of a motorcycle wheel, and one or more apertures 200. The one or more apertures may be used, for example, in coupling a leg member of a ski attachment assembly, see 140 in FIG. 3 or a wheel barrow wheel axle, to wheel attachment assembly 104. In some examples, the inner and out wheel attachment members may include apertures in place or in addition to slots in order to accommodate wheels having a through-axle.

Fender 124 of each of the pair of wheel attachment assemblies 104 may include an inner attachment flange 202 extending from first portion 132 of planar expanse 130 of fender 124 in a direction away from planar member 102. Fender 124 may include an outer attachment flange 204 extending from second portion 134 of the planar expanse of the fender. One or both of inner fork arm 184 and outer fork arm 186 may be coupled to the fender via the inner attachment flange and the outer attachment flange, respectively. In some examples, the inner and outer fork arms may be coupled directly to the planar expanse of the fender.

Each of the pair of wheel attachment assemblies 104 may include one or more inner struts 206 extending between fender 124 and inner fork arm 184. The inner strut(s) may be configured to prevent or help prevent rotation of the inner fork arm relative to planar member 102 about lateral rotation axis 180. The inner strut(s) may be coupled to the fender at a location 208 distal, i.e. spaced from, a top end 210 of the inner fork arm. The inner strut(s) may be coupled to the fender via inner attachment flange 202 via, for example, bolts or screws. The inner strut(s) may be coupled to the inner fork at a location 212 proximate bottom end 192 of the inner fork arm.

Each of the pair of wheel attachment assemblies 104 may include one or more outer struts 214 extending between fender 124 and outer fork arm 186. The outer strut(s) may be configured to prevent or help prevent rotation of the outer fork arm relative to planar member 102 about lateral rotation axis 180. The outer strut(s) may be coupled to the fender at a location 216 distal, i.e. spaced from, a top end 218 of the outer fork arm. The outer strut(s) may be coupled to the fender via outer attachment flange 204 via, for example, bolts or screws. The outer strut(s) may be coupled to the outer fork at a location 220 proximate bottom end 194 of the outer fork arm.

In some examples, inner fork arm 184, and the one or more inner struts 206 may be replaced with a single member or plate which extends along fender 124 in the direction of travel 158 and is configured to be coupled to the axle of wheel 108. Similarly, outer fork arm 186, and the one or more outer struts 214 may be replaced with a single member or plate which extends along fender 124 in the direction of travel 158 and is configured to be coupled to the axle of wheel 108.

The pair of wheel attachment assemblies 104 may be coupled to planar member 102 by first inserting the edge portion 164 of the planar member 102 into channel 162 and then securing the edge portion of the planar member within the channel. Inserting the planar member into the channel may include abutting the lateral edge 136 of the planar member against the side portion 172 of clamping member 126. Securing the edge portion within the channel may include coupling upper portion 170 of the clamping member to the planar member. The wheel attachment assemblies may include a plurality of nuts 222 attached, perhaps welded, to the upper portion of the clamping member. The nuts may be threaded and may be positioned over a plurality of holes 224 in the upper portion of the clamping member. A plurality of bolts 226 may be configured to pass through the nuts and the holes in the clamping member and make contact with the upper major face 116 of the planar member.

Each of the pair of wheel attachment assemblies 104 may be at least partially dismantled when not in use with cart 100 and/or kit 120. For example: inner strut(s) 206 may be decoupled from fender 124 and inner fork arm 184; the inner fork arm may be decoupled from the fender and wheel 108; outer strut(s) 214 may be decoupled from the fender and outer fork arm 186; the outer fork arm may be decoupled from the fender and the wheel; and the fender and clamping member 126 may be decoupled from planar member 102. These components could then be stowed or stored in a box that is much smaller than the size of cart 100. Any of all of these components may be separated from the other components by decoupling one or more bolts with a wrench, which may be a relatively simple and quick process.

In some examples, wheel attachment assembly 104 may be coupled to planar member 102 without a clamping member such as clamping member 126. In these examples, fender 124 may be directly coupled to the planar member. The planar expanse 130 of the fender may be configured to be secured to the planar member, for example, via bolts, screws, nails, rivets or any other appropriate fasteners.

Planar expanse 130 may include a plurality of apertures each capable of receiving a bolt. A plurality of holes or passages may be drilled through the planar member and may align with the plurality of apertures in the fender. Bolts may be inserted through the plurality of passages in the planar member and through the plurality of apertures in the fender and secured. The bolts may be secured directly to the fender, in cases where the plurality of apertures in the fender are threaded, or may be secured to nuts on the side of the fender which is opposite to the planar member.

Figure 7:
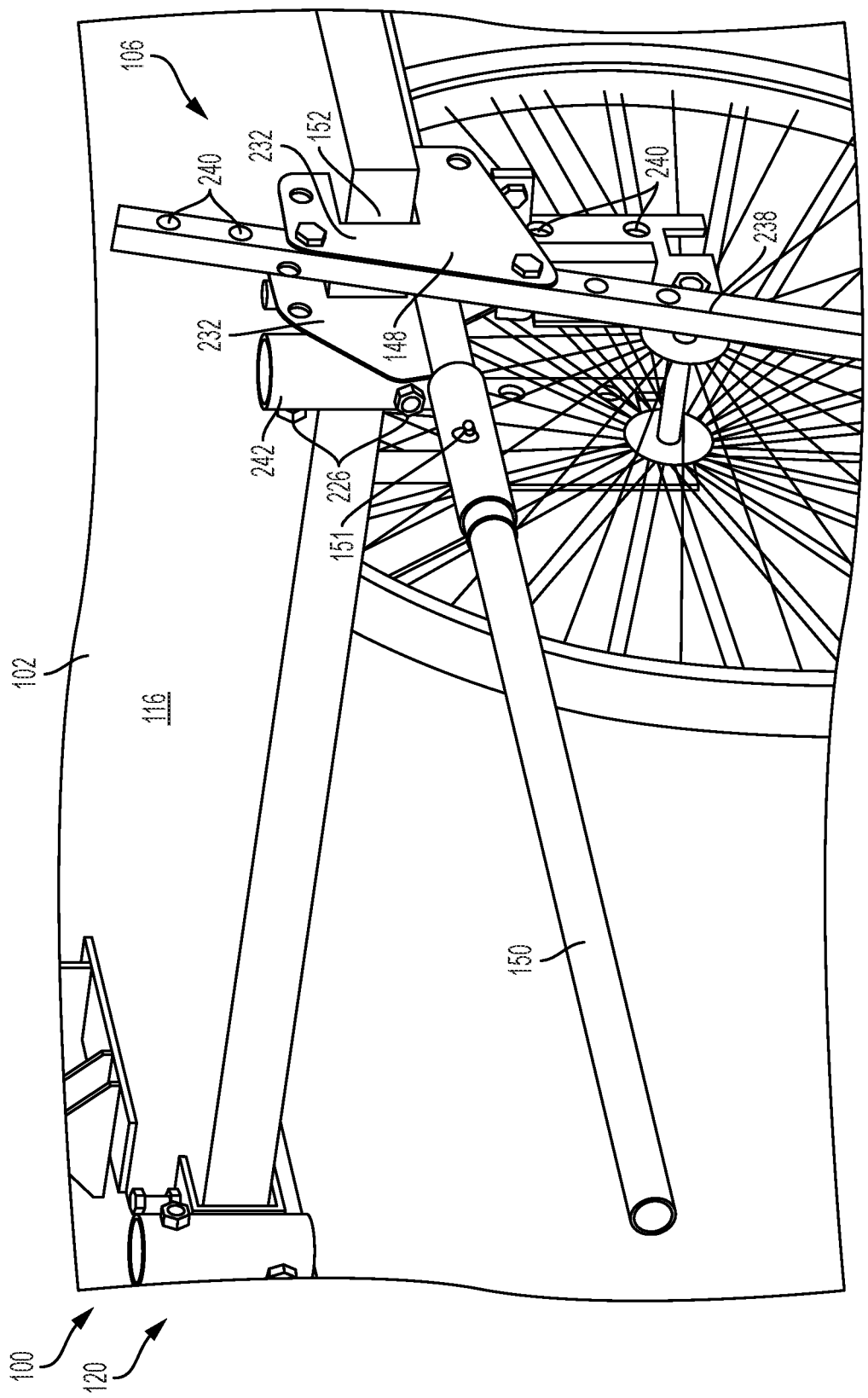
FIG. 7 is a detailed view of a handle attachment assembly of the cart of FIG. 1, showing a handle clamp coupled to an edge portion of the planar member.
Figure 8:
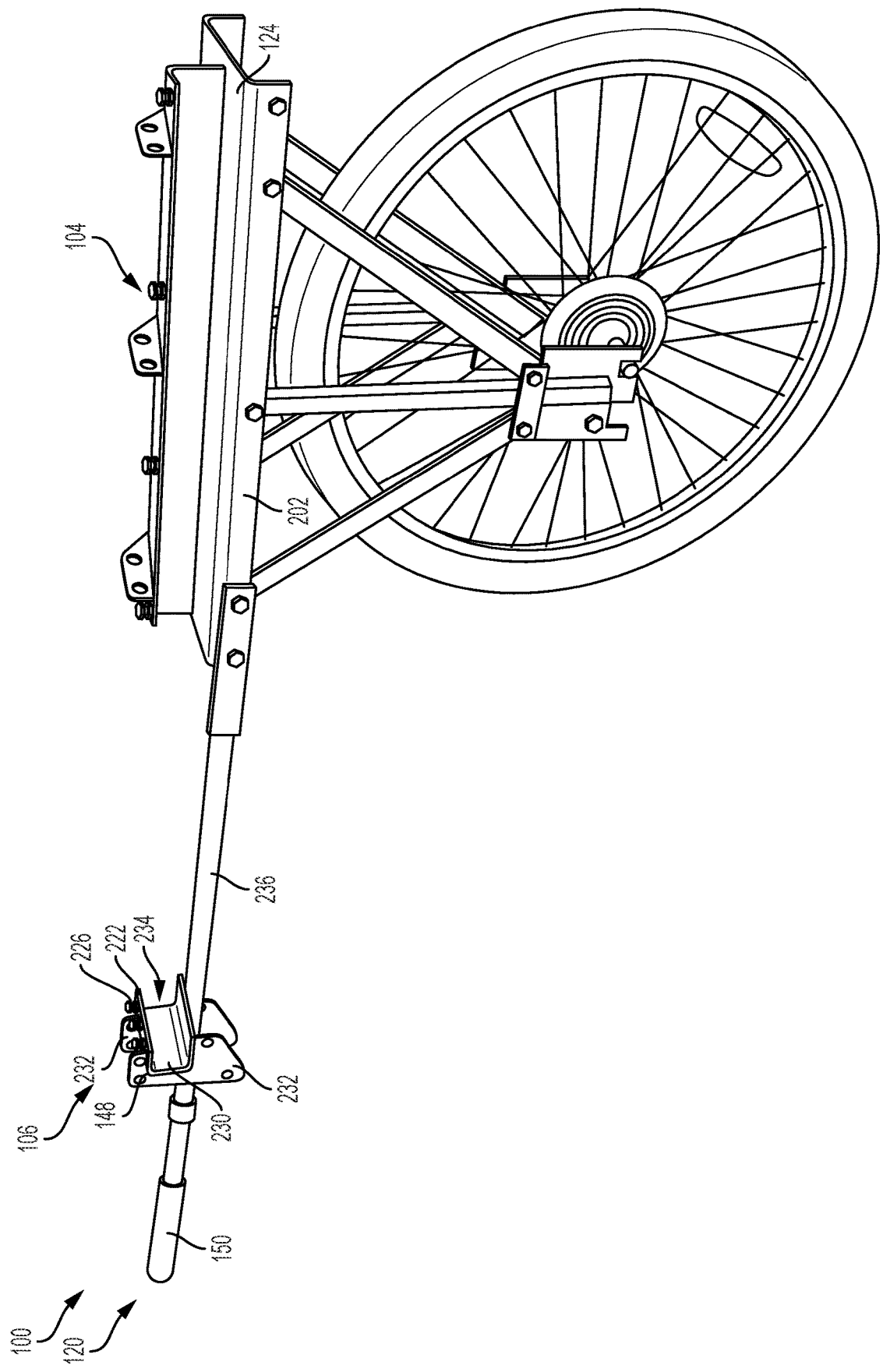
FIG. 8 is a detailed view of a handle attachment assembly of the cart of FIG. 1 coupled via a rigid member to a wheel attachment assembly of the cart of FIG. 1.

FIG. 7 is a detailed view of handle attachment assembly 106 of the cart 100 and/or kit 120, with handle attachment assembly 106 coupled to planar member 102. FIG. 8 is a detailed view of handle attachment assembly 106 coupled to one of the pair of wheel attachment assemblies 104 of cart 100, with both of the handle attachment assembly and the wheel attachment assembly not coupled to the planar member. FIGS. 7 and 8 are herein described together.

Handle clamp 148 may include a channel member 230 and one or more vertical plates 232. Channel member 230 may include a channel 234 sized to receive edge portion 152 of planar member 102. The handle clamp may include one or more nuts 222 attached to the channel member above one or more holes in the channel member, in a manner similar to the clamping member of the wheel attachment assemblies. Handle attachment assembly 106 may further include one or more bolts 226 configured to pass through the one or more nuts and the one or more holes in the channel member to make contact with the upper major face 116 of the planar member, thereby securing the handle clamp to the planar member.

Handle attachment assembly 106 may include a rigid member 236 configured to be coupled to handle clamp 148 and to one of the pairs of wheel attachment assemblies 104. Rigid member 236 may provide additional stability to cart 100 and may help to secure one or both of the handle attachment assembly and the wheel attachment assembly to the cart. The rigid member may be coupled to inner attachment flange 202 of fender 124 of the wheel attachment assembly, for example, via one or more bolts, etc.

Handle attachment assembly 106 may include a safety bar 238 configured to be coupled to handle clamp 148 in a generally vertical orientation. Safety bar 238 may be configured to extend generally downward from planar member 102 to the ground. The safety bar may be slightly angled relative to a vertical direction when planar member 102 is horizontal. In some examples, the safety bar may make an angle of approximately 13 degrees with the vertical direction when the planar member is horizontal. The safety bar may be configured to prevent the planar member from tipping too far around a lateral rotation axis and may also act as a brake if the operator drops the cart handle. This may prevent gear or other contents from falling off cart 100 when the cart is stopped. The safety bar may be coupled to one of the vertical plates 232, for example, via one or more bolts or screws, etc. The safety bar may include a plurality of apertures 240 so that the safety bar can be coupled to the handle clamp in a variety of relative orientations.

Handle attachment assembly 106 may include a bracket 242 coupled to handle clamp 148. The bracket may be configured to receive a shaft, such as a broom stick, broom handle, shovel handle, etc., in a vertical orientation and extending downward toward the ground. The handle attachment assembly may be configured to secure the shaft relative to the planar member. If the shaft extends to the ground when the planar member is in a horizontal orientation, shaft 242 may prevent or inhibit rotation of the planar member about a lateral rotation axis, thereby maintaining the horizontal orientation of the planar member. Bracket 242 may be a section of cylindrical pipe and may include one or more bolts 226 for securing the shaft within the bracket.

Figure 9:
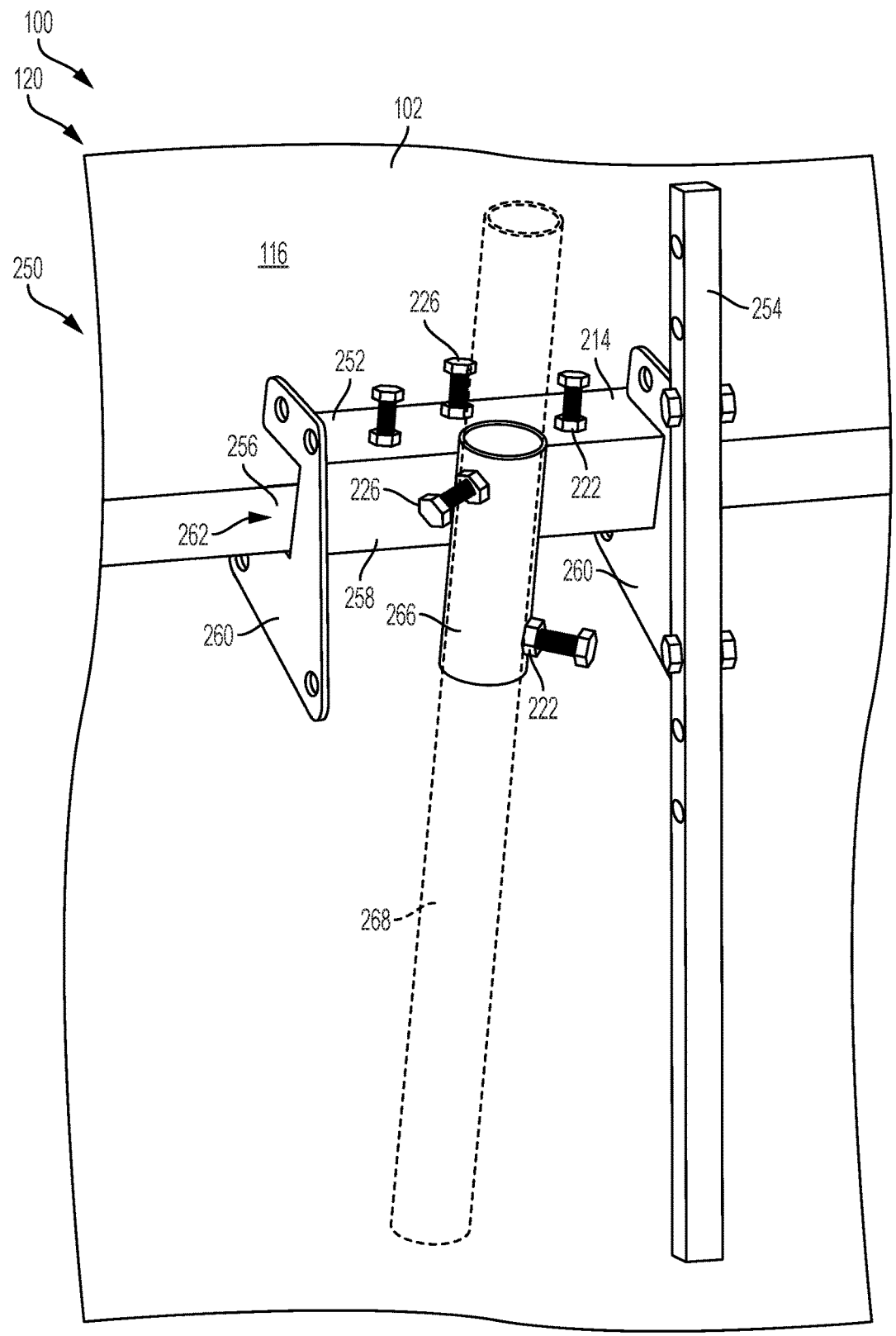
FIG. 9 is a detailed view of a rear safety bar assembly of the cart of FIG. 1.

FIG. 9 is a detailed view of a rear safety bar assembly, generally indicated at 250, of cart 100 and/or kit 120. Rear safety bar assembly may include a rear safety bar clamp 252 and a safety bar 254. The rear safety bar clamp may be configured to be coupled to an edge portion 256 of planar member 102. The rear safety bar clamp may include a channel member 258 and one or more vertical plates 260. Channel member 258 may include a channel 262 sized to receive the edge portion of the door. The rear safety bar clamp may include one or more threaded nuts 222 attached, for example welded, to channel member 258 over one or more holes in a top side 264 of the channel member. The rear safety bar assembly may include one or more bolts 226 configured to extend through the nuts and the holes in the channel member to engage with the top side 116 of the planar member, thereby securing the rear safety bar clamp to the planar member.

Safety bar 254 may be configured to be coupled to rear safety bar clamp 252 in a generally vertical orientation and extending generally downward from the planar member toward the ground. Safety bar 254 may be similar to safety bar 238 of the handle attachment assembly 106 shown in FIGS. 7-8. Safety bar 254 may be coupled to vertical plates 260 in a manner similar to how safety 238 may be coupled to vertical plates 232.

Rear safety bar assembly 250 may include a bracket 266 coupled to the rear safety bar clamp 252. Bracket 266 may be substantially similar to bracket 242 of handle attachment assembly 106 described in reference to FIGS. 7-8. Bracket 266 may be configured to receive a shaft 268, such as a broom stick or other tool handle, in a vertical orientation extending toward the ground. The rear safety bar assembly may be configured to secure the shaft relative to planar member 102, for example, via bolts 226 passing through nuts 222 attached to the bracket.

In some examples, shaft 268 may be secured in bracket 266 of rear safety bar assembly 150 and another shaft may be secured in bracket 242 of handle attachment assembly 106 shown in FIGS. 7-8, with both shafts extending all the way to the ground and the planar member in a horizontal orientation. The shafts may then prevent rotation of the planar member about a lateral rotation axis and/or tipping forward or backward of the planar member. This may be a useful configuration for loading or unloading of the cart 100. Further, in this stable horizontal configuration, cart 100 may be used as a table or other work surface.

Figure 13:
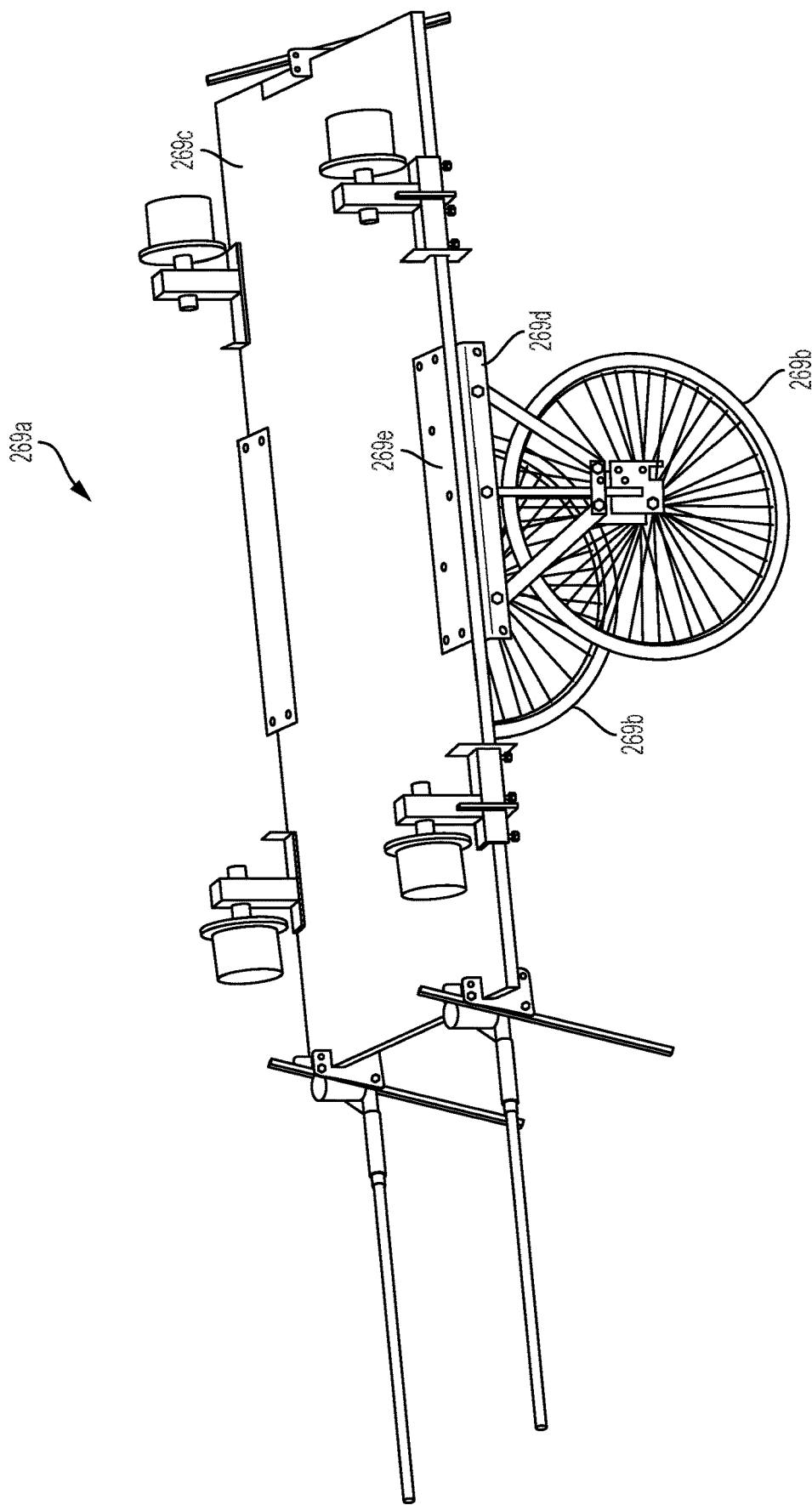
FIG. 13 is an isometric view of another example of a cart coupled to a pair of bicycle wheels and a set of topside railroad rail wheel assemblies.

FIG. 13 shows an alternative cart configuration. Most of the design features of cart 269a are substantially the same as described above relative to cart 100 in FIG. 1, except for the mechanism used to attach wheels 269b to door 269c. Specifically, for example, fender 269d is sandwiched with plate 269e on opposite sides of door 269c. Upper panel portion of fender 269d has a matching hole pattern with plate 269e for receiving common bolts through matching holes created in door 269.

Figure 10:
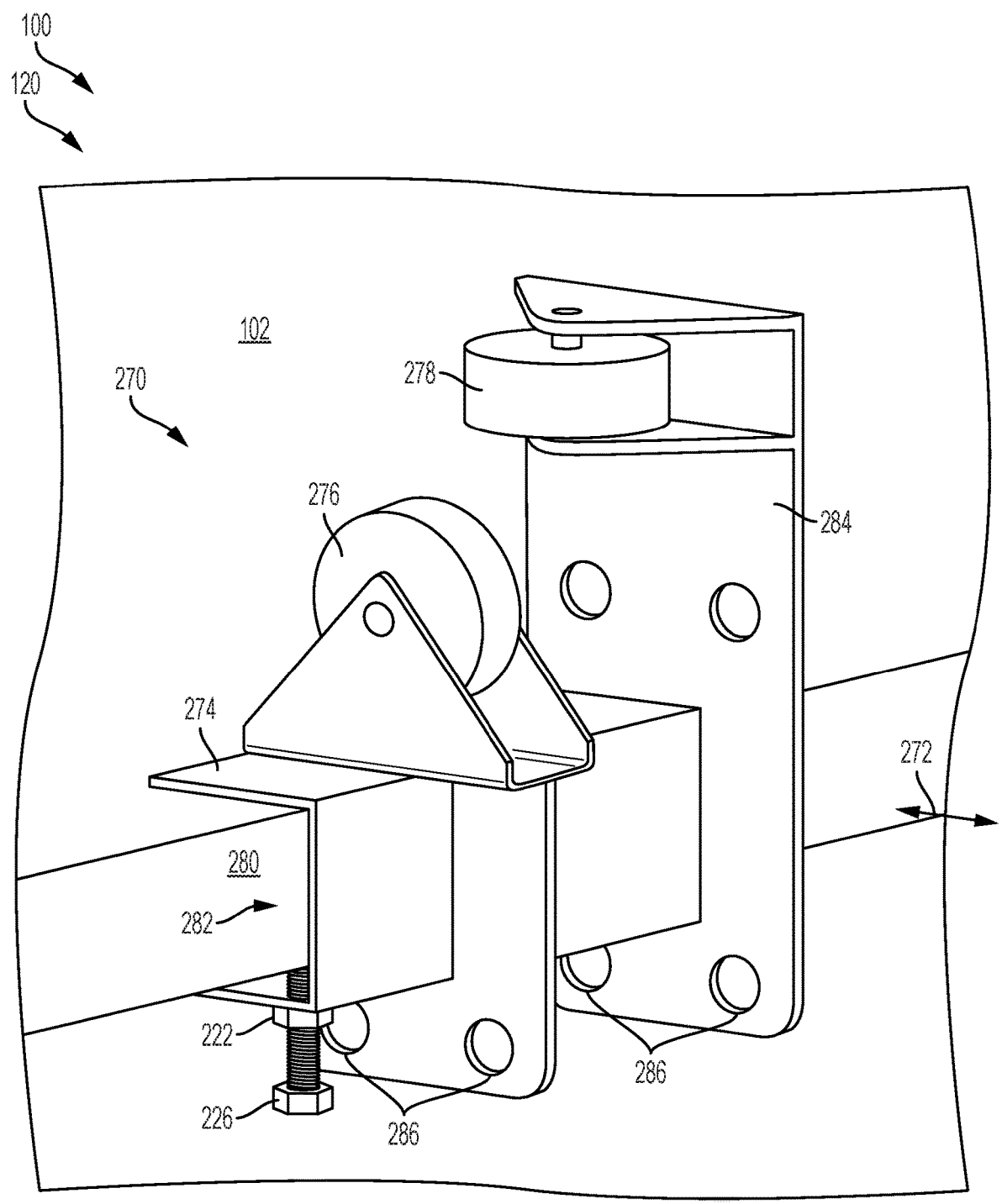
FIG. 10 is a detailed view of a railroad rail wheel assembly of the first set of topside railroad rail wheel assemblies of FIG. 1.

FIG. 10 is a detailed view of a first railroad rail wheel assembly, generally indicated at 270, of cart 100 and/or kit 120. FIGS. 1 and 2 show cart 100 including four of the first railroad wheel assemblies 270 coupled to planar member 102. The first railroad wheel assemblies may allow cart 100 to be configured to travel on a pair of railroad tracks with the cart supported on the railroad tracks by the first railroad wheel assemblies. When configured to travel on railroad tracks, cart 100 may be upside down relative to the orientation of the cart shown in FIGS. 1-3. When traveling on railroad tracks, cart 100 may travel in a secondary direction of travel 272, see also in FIG. 1, which may be transverse to the primary direction of travel 158 of cart 100 when supported by wheels 108 or skis 122, see FIGS. 1-3.

Each of the first railroad rail wheel assemblies 270 may include a channel member 274, a support wheel 276, and an alignment wheel 278. Channel member 274 may be configured to be secured to an edge portion 280 of planar member 102, and may have a channel 282 sized to receive edge portion 280. Channel member 274 may be secured to the planar member via one or more nuts 222 and bolts 226 as with the rear clamp assembly 250 shown in FIG. 9, the handle clamp assembly 106 shown in FIGS. 7-8, and/or the wheel attachment assembly 104 shown in FIGS. 4-6.

Support wheel 276 may be coupled to channel member 274 and may be configured to ride atop a head portion of a railroad rail. Alignment wheel 278 may be coupled to the channel member, for example via a vertical plate 284. Alignment wheel may be oriented perpendicularly to support wheel 276 and may be configured to ride along an inboard side of the head portion of the railroad rail.

It will be appreciated, see for example in FIGS. 1 and 2, that each of the first railroad wheel assemblies 270 may not be identical. For example, two of the first railroad wheel assemblies on the same long edge of planar member 102 may have the relative positions of the support wheel 276 and alignment wheel 278 switched, so that the alignment wheel is always on the inboard side of whatever railroad rail the respective support wheel is supported on. The inboard alignment of the alignment wheels may prevent cart 100 from slipping off of the railroad tracks.

First railroad rail wheel attachment assembly 270 may include one or more attachment points 286. A handle, such as handle 150 shown in FIGS. 1 and 7-8, may be attached to the assembly at attachment points 286. Attaching one or more handles to the railroad wheel attachment assemblies may facilitate configuring cart 100 for travel along a pair of railroad track, as a person may push or pull the cart along direction 272 via the one or more handles.

Figure 11:
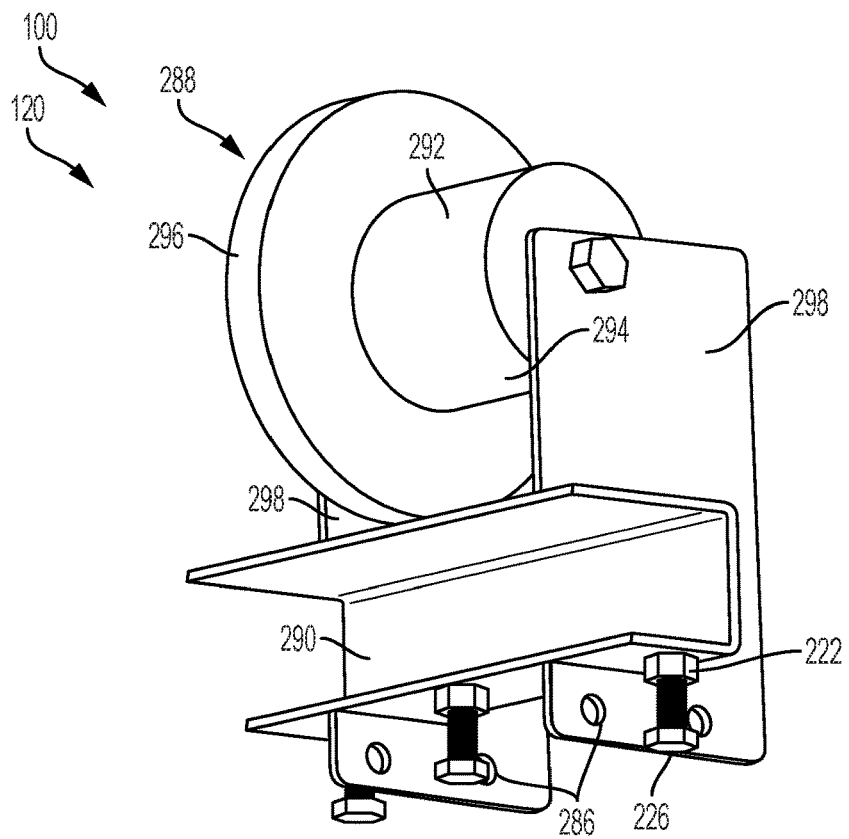
FIG. 11 is a detailed view of a railroad rail wheel assembly of the second set of topside railroad rail wheel assemblies of FIG. 3.

FIG. 11 is a detailed view of a second railroad rail wheel assembly, generally indicated at 288, of cart 100 and/or kit 120. FIG. 3 shows cart 100 including four of the second railroad wheel assemblies 288 coupled to planar member 102. The second railroad rail wheel assemblies 288 may allow cart 100 to be configured to travel on a pair of railroad track in a similar manner as the first railroad rail wheel assemblies 270 shown in FIG. 10.

Each of the second railroad rail wheel assemblies 288 may include a channel member 290, and a flanged wheel 292. Channel member 290 may be configured to be coupled to a planar member in a manner similar to channel member 274 of the first railroad rail wheel assembly 270 shown in FIG. 9, that is via one or more nuts 222 and bolts 226.

Flanged wheel 292 may include a support portion 294 and an alignment flange 296. In some examples, flanged wheel 292 may be coupled to channel member 290 via one or more vertical plates 298. Support portion 294 may be configured to ride atop a head portion of a railroad rail and alignment flange 296 may be configured to be disposed proximate an inboard side of the head portion of the railroad rail. Support portion 294 and support wheel 276 shown in FIG. 9 may serve similar functions. Alignment flange 296 and alignment wheel 278 shown in FIG. 9 may serve similar functions.

In some examples, an axle of flanged wheel 292 may be connected to a single vertical plate or post which is, in turn, connected to channel member 290. Examples of flanged wheels include, but are not limited to, cast wheel included with the AATS-12 Stub Axle Assembly, the AATS-12A Stub Axle Assembly, and/or the AATS-13 Stub Axle Assembly available through the Nolan Company.

Flanged wheel 292 may be configured to have an opposite orientation between vertical plates 298 than the orientation shown in FIG. 11. See, for example, in FIG. 3 where two of the second railroad rail wheel assemblies 288 on the same long edge of the planar member have flanged wheels 292 with opposite orientations. In the configuration shown in FIG. 3, both of the alignment flanges are configured to be proximate the inboard side of the respective railroad rails on which the flanged wheels would be supported. The inboard alignment of the alignment flanges may facilitate cart 100 staying on the railroad tracks. Second railroad rail wheel assembly 288 may have attachment points 286 as with first railroad rail wheel assembly 270 shown in FIG. 10 for attachment of one or more handles.

Either of both of the first and second railroad rail wheel assemblies 270 and 288 may be used to transport cart 100 along a set of railroad tracks. In such a configuration, the upper major face 116 of planar member 102 may in fact be a lower face of the planar member and the lower major face 114 of the planar member may in fact be an upper face of the planar member, see FIGS. 1-3, as cart 100 may be upside down relative to the orientation shown in FIGS. 1-3. To transition from using cart 100 on wheels 108 and/or skis 122 to using cart 100 on support wheels 276 and/or flanged wheels 292, a user may need to unload any gear secured to the upper major face 116 of the cart, flip the cart over onto the set of railroad tracks, and reload the gear onto the lower major face 114 of the cart, which may now face upwards. Further, handles 150 shown in FIG. 1 may be removed from the handle attachment assemblies 106 and reattached to the first or second railroad rail wheel assemblies at attachment points 286.

Example 2

Figure 12:
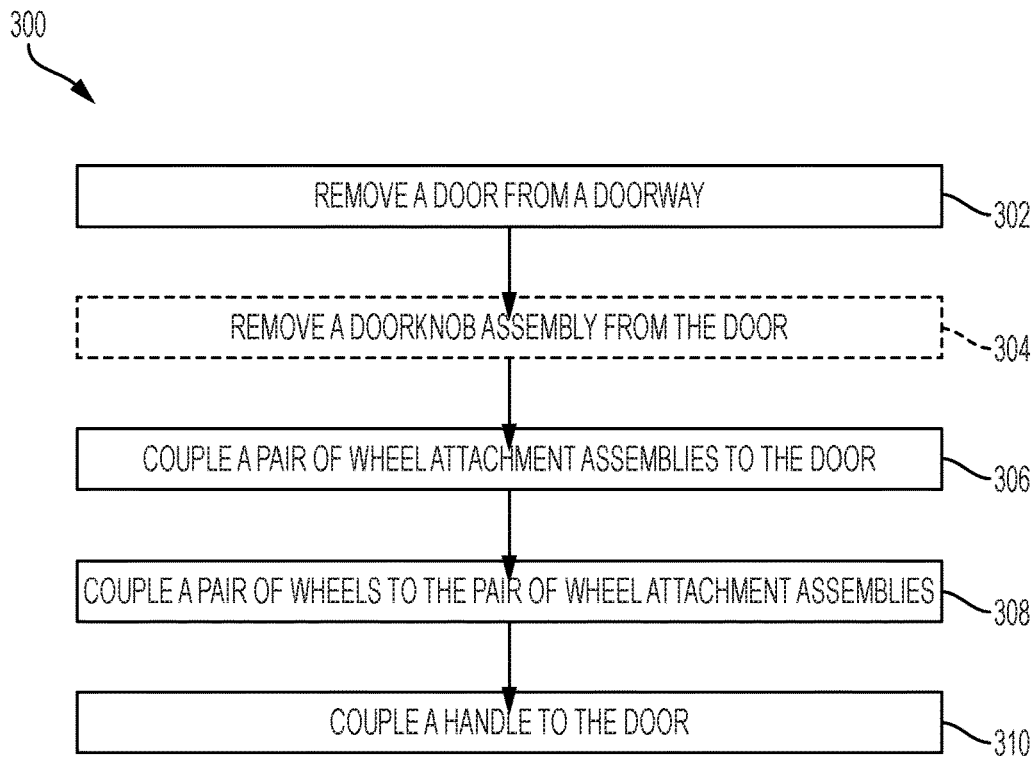
FIG. 12 is a flow chart illustrative a method of converting a door into a bed of a cart.

This example describes an illustrative method of converting a door into a bed of a cart, which may be used in conjunction with any of the apparatuses or methods described herein; see FIG. 12.

FIG. 12 depicts multiple steps of a method, generally indicated at 300, of converting a door into a bed of a cart. Method 300 may be used in conjunction with any of the conversion kits depicted in and described in reference to FIGS. 1-11. Although various steps of method 300 are described below and depicted in FIG. 12, the steps need not necessarily all be performed, and in some cases may be performed in a different order than the order shown.

Method 300 may include a step 302 of removing a door from a doorway. Removing a door from a doorway may include uncoupling the door from one or more hinges or hangers. Removing the door from the doorway may include orienting the door in a generally horizontal orientation, in contrast to a generally vertical orientation of the door when in use as an entrance. In some examples, when the door has not been in use as an entrance, step 302 may not be performed. In some examples, when a different planar member is used in place of a door, step 302 may not be performed.

Method 300 may optionally include a step 304 or removing a doorknob assembly from the door. In some examples, depending on the desired location of a wheel attachment assembly, such as assembly 104 in FIGS. 4-6, relative to a location of a doorknob, the doorknob may interfere with the coupling between the wheel attachment assembly and the door. In these examples, it may be advantageous to remove the doorknob assembly prior to attaching the wheel attachment assemblies to the door.

Method 300 may include a step 306 of coupling a pair of wheel attachment assemblies to the door. Each wheel attachment assembly may include a clamp portion configured to couple the wheel attachment assembly to an edge portion of the door and a fork configured to be coupled to a wheel. Coupling a pair of wheel attachment assemblies to the door may include receiving a respective edge portion of the door in a channel of the clamp portion for each of the pair of wheel attachment assemblies. The edge portion of the door may include portions of any or all of a top side of the door, an underside of the door, an edge face of the door, and a bulk of the door, where terms such as top and under assume the door is in a generally horizontal orientation. The edge portions of the door may include portions of side rails or stiles of the door.

Each of the clamp portions of the wheel attachment assemblies may include a fender and a clamping member. The fender may have a planar expanse and may be configured to abut the underside of the door. The clamping member may be configured to be coupled to the top side of the door. The channel in which the edge portion of the door is received may be defined as a space between the fender and the clamping member. A portion of the planar expanse of the fender may be configured to contact the underside of the door and another portion of the planar expanse may be configured to extend beyond a lateral edge of the underside of the door.

Coupling a pair of wheel attachment assemblies to the door may include threading a plurality of bolts through apertures in the clamping member so that the plurality of bolts exert a clamping pressure on the top side of the door. In some examples, the bolts may directly contact the top side of the door and exert contact forces on the door. In some examples, the bolts may exert the clamping pressure on the top side of the door through an intermediate member. Such an intermediate member may be configured to protect a finish on the door, for example.

Method 300 may include a step 308 of coupling a pair of wheels to the pair of wheel attachment assemblies. That is, one of the pair of wheels may be coupled to one of the pair of wheel attachment assemblies and the other of the pair of wheels may be coupled to the other of the pair of wheel attachment assemblies. The pair of wheels may be a pair of bicycle wheels, a pair of motorcycle wheels, a pair of wheelbarrow wheels, or any other appropriate pair of wheels. The pair of wheels may be coupled to the respective forks of the pair of wheel attachment assemblies.

In some examples, coupling a pair of wheels to the pair of wheel attachment assemblies may include coupling an axle of the wheel of the pair of wheels to an inner fork arm and an outer fork arm of the fork, and similarly for the other wheel of the pair of wheels. Coupling an axle of a wheel of the pair of wheels to an inner fork arm and an outer fork arm of the fork may include inserting the axle of the wheel into a slot in an inner wheel attachment member coupled to the inner fork arm and into a slot in an outer wheel attachment member coupled to the outer fork arm. Coupling an axle of a wheel of the pair of wheels to an inner fork arm and an outer fork arm of the fork may include securing the inner wheel attachment member and the outer wheel attachment member to a hub of the wheel. A quick release mechanism of a bicycle wheel, for example, may be able to accomplish such securing.

In some examples, the inner and outer wheel attachment members may include apertures instead of or in addition to slots. Apertures may be able to accommodate a through-axle wheel structure, such as a wheel barrow wheel axle, whereas slots may be better adapted to accommodate a drop-in style axle.

Method 300 may include a step 310 of coupling a handle to the door. The handle may allow a user to move the cart by pushing or pulling the cart via the handle. Coupling a handle to the door may include coupling a handle clamp to an edge portion of the door. In some examples, the edge portion of the door may include a portion of a top rail or a bottom rail of the door. The handle clamp may have a channel sized to receive the edge portion of the door. Coupling the handle to the door may include threading a plurality of bolts through apertures in the handle clamp so that the plurality of bolts exert a clamping pressure on the top side of the door.

Coupling a handle to the door may include coupling a handle to the handle clamp. The handle may be coupled to the handle clamp by threaded attachment, via one or more pins, screws, or bolts, or any other appropriate attachment mechanism. The handle may be releasably coupled to the handle clamp, so that the handle may be repeatably attached and unattached to the door. In some examples, the handle may be a bar, shaft, or other rigid member configured to be gripped by a user of the cart. In some examples, the handle may have attachment points so that the cart may be towed by a vehicle or a horse.

In some examples, coupling a handle to the door may include coupling the handle clamp to one of the pair of wheel attachment assemblies via a rigid member. Coupling the handle clamp to one of the wheel attachment assemblies may increase the stability of one or both of the handle clamp and the wheel attachment assembly. The rigid member may be a bar which may be coupled to the handle clamp or the wheel attachment assembly by threaded attachment, welding, or via one or more bolts, screws, rivets, etc.

In some examples, coupling a handle to the door may include coupling a pair of handles to the door at spaced apart location around the edge portion of the door. The pair of handles may have a space between them to accommodate a user who may grip each of the handles in their left and right hands in order to move the cart.

It should be noted that similar kits and assemblies may be configured as discussed in detail above, except using other common, standardly dimensioned objects instead of a door. For example, a single bed's box spring mattress could be attached to a wheel assembly by using a piece of angle iron. The box springs would take the place of the door, in embodiments discussed above and as illustrated in the drawings, to make a cart.

The angle iron could be bolted through one of its legs to the flat surface of the wheel assembly and the other leg may have small holes for receiving wood screws passing into a side wall of the box springs. It is also possible to design numerous different devices for mounting wheels, skis, or railroad rail wheels on a door or box springs without departing from the general scope of the examples outlined, described, and illustrated in this disclosure.

Example 3

This section describes additional aspects and features of carts, kits for converting doors into carts, and method for converting doors into carts, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A1. A kit for converting a door into a cart, the kit comprising:

a pair of wheel attachment assemblies, each wheel attachment assembly including:

a fender having a planar expanse with a first portion of the planar expanse configured to abut an under side of a door when the door is in a non-vertical orientation and a second portion of the planar expanse configured to extend beyond a lateral edge of the door a clamping member coupled to the fender, the clamping member having an upper portion configured to be coupled a top side of the door when the door is in a non-vertical orientation and a side portion configured to abut the lateral edge of the door;

an inner fork arm coupled to the first portion of the planar expanse of the fender;

an outer fork arm coupled to the second portion of the planar expanse of the fender;

an inner wheel attachment member coupled to the inner fork arm proximate a bottom end of the inner fork arm; and an outer wheel attachment member coupled to the outer fork arm proximate a bottom end of the outer fork arm;
wherein a channel between the clamping member and the fender is sized to receive an edge portion of a door; and
wherein the inner and outer wheel attachment members are each configured to receive an axle of a bicycle wheel.

A2. The kit of paragraph A1, wherein each wheel attachment assembly includes a gusset configured to stabilize the clamping member relative to the fender.

A3. The kit of paragraph A2, wherein the gusset is one of a plurality of gussets, and each of the plurality of gussets is coupled to the fender, the side portion of the clamping member and the upper portion of the clamping member.

A4. The kit of paragraph A1, wherein the clamping member of each of the pair of wheel attachment assemblies is an angle iron and the angle iron is coupled to the fender along a long edge of the angle iron.

A5. The kit of paragraph A4, wherein the angle iron of each of the pair of wheel attachment assemblies has a length in a range of one to three feet.

A6. The kit of paragraph A1, wherein the planar expanse of the fender of each of the pair of wheel attachment assemblies has a length in a range of one to three feet.

A7. The kit of paragraph A6, wherein the fender of each of the pair of wheel attachment assemblies includes an inner attachment flange extending from the first portion of the planar expanse of the fender in a direction away from the door and an outer attachment flange extending from the second portion of the planar expanse of the fender.

A8. The kit of paragraph A1, wherein each of the pair of wheel attachment assemblies includes:
an inner strut extending between (a) the fender at a location distal a top end of the inner fork arm and (b) the inner fork arm at a location proximate a bottom end of the inner fork arm; and
an outer strut extending between (a) the fender at a location distal a top end of the outer fork arm and (b) the outer fork arm at a location proximate a bottom end of the outer fork arm.

A9. The kit of paragraph A1, wherein the inner wheel attachment member and the outer wheel attachment member of each of the pair of wheel attachment assemblies are additionally configured to receive an axle of a motorcycle wheel.

A10. The kit of paragraph A9, wherein at least one of the inner wheel attachment member and the outer wheel attachment member of each of the pair of wheel attachment assemblies is additionally configured to be coupled to a leg member of a ski attachment assembly.

A11. The kit of paragraph A1, further comprising:
a handle attachment assembly including a handle clamp and a handle, the handle clamp configured to be coupled to an edge portion of the door and the handle configured to be coupled to the handle clamp.

A12. The kit of paragraph A11, wherein the handle attachment assembly further includes a rigid member configured to be coupled to the handle clamp and to one of the pair of wheel attachment assemblies.

A13. The kit of paragraph A11, wherein the handle clamp includes a channel sized to receive an edge portion of the door.

A14. The kit of paragraph A11, wherein the handle attachment assembly further includes a safety bar configured to be coupled to the handle clamp in a generally vertical orientation and extending generally downward from the door to the ground.

A15. The kit of paragraph A11, wherein the handle clamp is further configured to be coupled to a car attachment assembly.

A16. The kit of paragraph A11, wherein the handle attachment assembly further includes a bracket coupled to the handle clamp, the bracket configured to receive a broom stick in a vertical orientation extending toward the ground and the handle attachment assembly is configured to secure the broom stick relative to the door.

A17. The kit of paragraph A11, wherein the handle attachment assembly is one of a pair of handle attachment assemblies configured to be coupled to an edge portion of the door at spaced apart locations around the lateral edge of the door.

A18. The kit of paragraph A1, further comprising:
a rear safety bar assembly including a rear safety bar clamp and a safety bar, the rear safety bar clamp configured to be coupled to an edge portion of the door and the safety bar configured to be coupled to the rear safety bar clamp in a generally vertical orientation and extending generally downward from the door toward the ground.

A19. The kit of paragraph A18, wherein the rear safety bar assembly further includes a bracket coupled to the rear safety bar clamp, the bracket configured to receive a broom stick in a vertical orientation extending toward the ground and the rear safety bar assembly is configured to secure the broom stick relative to the door.

B1. A method of converting a door into a cart, the method comprising:
coupling a pair of wheel attachment assemblies to a door, each wheel attachment assembly including:
a fender configured to abut an under side of a door when the door is in a non-vertical orientation;
a clamping member coupled to the fender, the clamping member configured to (a) abut a top side of the door when the door is in a non-vertical orientation and (b) abut a side edge of the door;
an inner fork arm coupled to the fender;
an outer fork arm coupled to the fender;
an inner wheel attachment member coupled to the inner fork arm proximate a bottom end of the inner fork arm; and
an outer wheel attachment member coupled to the outer fork arm proximate a bottom end of the outer fork arm;
wherein a channel between the clamping member and the fender is sized to receive an edge portion of a door; and
wherein the inner and outer wheel attachment members each include a first slot sized to receive an axle of a bicycle wheel;
coupling a pair of wheels to the wheel attachment assemblies, with each wheel coupled to the inner and outer wheel attachment members of the respective wheel attachment assembly; and
coupling a handle to the door;
wherein a channel between the clamping member and the fender is sized to receive an edge portion of a door.

C1. A method of converting a door into a bed of a cart, the method comprising:
removing a door from a doorway;
coupling a pair of wheel attachment assemblies to the door, each wheel attachment assembly including:
a clamp portion configured to couple the wheel attachment assembly to an edge portion of a door; and
a fork configured to be coupled to a wheel;
coupling a pair of wheels to the pair of wheel attachment assemblies; and
coupling a handle to the door.

C2. The method of paragraph C1, further comprising: removing a door knob assembly from the door.

C3. The method of paragraph C1, wherein removing a door from a doorway includes orienting the door in a generally horizontal orientation.

C4. The method of paragraph C1, wherein coupling a pair of wheel attachment assemblies to the door includes receiving a respective edge portion of the door in a channel of the clamp portion for each of the pair of wheel attachment assemblies.

C5. The method of paragraph C4, wherein the clamp portion includes (a) a fender having a planar expanse and configured to abut an underside of the door and (b) a clamping member configured to be coupled to a top side of the door, and the channel is defined as a space between the fender and the clamping member.

C6. The method of paragraph C5, wherein coupling a pair of wheel attachment assemblies to the door includes threading a plurality of bolts through apertures in the clamping member so that the plurality of bolts exert a clamping pressure on the top side of the door.

C7. The method of paragraph C1, wherein coupling a pair of wheels to the pair of wheel attachment assemblies includes coupling a bicycle wheel to each of the pair of wheel attachment assemblies.

C8. The method of paragraph C1, wherein coupling a pair of wheels to the pair of wheel attachment assemblies includes coupling a motorcycle wheel to each of the pair of wheel attachment assemblies.

C9. The method of paragraph C1, wherein coupling a pair of wheels to the pair of wheel attachment assemblies includes coupling an axle of a wheel of the pair of wheels to an inner fork arm and an outer fork arm of the fork.

C10. The method of paragraph C9, wherein coupling an axle of a wheel of the pair of wheels to an inner fork arm and an outer fork arm of the fork includes inserting the axle of the wheel into a slot in an inner wheel attachment member coupled to the inner fork arm and into a slot in an outer wheel attachment member coupled to the outer fork arm.

C11. The method of paragraph C10, wherein coupling an axle of a wheel of the pair of wheels to an inner fork arm and an outer fork arm of the fork includes securing the inner wheel attachment member and the outer wheel attachment member to a hub or axle of the wheel.

C12. The method of paragraph C1, wherein coupling a handle to the door includes coupling a handle clamp to an edge portion of the door.

C13. The method of paragraph C12, wherein the handle clamp has a channel sized to receive the edge portion of the door.

C14. The method of paragraph C12, wherein coupling a handle to the door includes threading a plurality of bolts through apertures in the handle clamp so that the plurality of bolts exert a clamping pressure on the top side of the door.

C15. The method of paragraph C14, wherein coupling a handle to the door includes coupling a handle to the handle clamp.

C16. The method of paragraph C15, wherein the handle is a bar configured to be gripped by a user of the cart.

C17. The method of paragraph C16, wherein coupling a handle to the door includes coupling the handle clamp to one of the pair of wheel attachment assemblies via a rigid member.

C18. The method of paragraph C1, wherein coupling a handle to the door includes coupling a pair of handles to the door at spaced apart locations around the edge portion of the door.

D1. A cart comprising:
a planar member having a lower major face, an upper major face, and an edge face extending from the lower major face to the upper major face, the planar member forming a bed of the cart;
a pair of wheel attachment assemblies, each wheel attachment assembly including:
 a fender having a planar expanse with a first portion of the planar expanse configured to abut the lower major face of the planar member when the planar member is in a non-vertical orientation and a second portion of the planar expanse configured to extend beyond a lateral edge of the planar member;
 a clamping member coupled to the fender, the clamping member configured to (a) be coupled to the upper major face of the planar member when the planar member is in a non-vertical orientation and (b) abut the edge face of the planar member; and
 a wheel fork coupled to the fender and configured to be coupled to an axle of a wheel;
a handle clamp configured to be coupled to an edge portion of the planar member;
a handle configured to be coupled to the handle clamp; and
a stabilizer bar spaced from the planar member and extending between the wheel forks of the pair of wheel attachment assemblies.

D2. The cart of paragraph D1, wherein each wheel fork includes an inner fork arm coupled to the first portion of the planar expanse of the fender and an outer fork arm coupled to the second portion of the planar expanse of the fender.

D3. The cart of paragraph D2, wherein each wheel fork includes an inner wheel attachment member coupled to the inner fork arm proximate a bottom end of the inner fork arm, and an outer wheel attachment member coupled to the outer fork arm proximate a bottom end of the outer fork arm; wherein the inner and outer wheel attachment members are each configured to receive the axle of the wheel.

D4. The cart of paragraph D1, wherein each of the pair of wheel attachment assemblies is configured to be coupled to a bicycle wheel.

D5. The kit of paragraph D1, further comprising:
a rear safety bar assembly including a rear safety bar clamp and a safety bar, the rear safety bar clamp configured to be coupled to an edge portion of the planar member and the safety bar configured to be coupled to the rear safety bar clamp in a generally vertical orientation and extending generally downward from the planar member toward the ground.

D6. The kit of paragraph D5, wherein the rear safety bar assembly further includes a bracket coupled to the rear safety bar clamp, the bracket configured to receive a shaft in a vertical orientation extending toward the ground and the rear safety bar assembly is configured to secure the shaft relative to the planar member.

E1. A kit for converting a door into a cart, the kit comprising:
a pair of wheel attachment assemblies, each wheel attachment assembly including:
 a fender having a planar expanse with a first portion of the planar expanse configured to abut a major face of a door when the door is in a non-vertical orientation and a second portion of the planar expanse configured to extend beyond a lateral edge of the door
 an inner fork arm coupled to the first portion of the planar expanse of the fender;

an outer fork arm coupled to the second portion of the planar expanse of the fender;
an inner wheel attachment member coupled to the inner fork arm proximate a bottom end of the inner fork arm; and
an outer wheel attachment member coupled to the outer fork arm proximate a bottom end of the outer fork arm;
wherein the planar expanse is configured to be secured to the door; and
wherein the inner and outer wheel attachment members are each configured to receive an axle of a bicycle wheel.

E2. The kit of paragraph E1, wherein the planar expanse includes a plurality of apertures, with each of the plurality of apertures configured to receive a bolt which extends through the door.

F. A cart comprising:
a door having a top edge, a bottom edge, and first and second side edges connecting the top and bottom edges, and one or more apertures for attaching a hinge assembly adjacent the first side edge, one or more apertures for attaching a handle adjacent the second side edge,
first and second fender assemblies, the first fender assembly being clamped to the first side edge of the door, and the second fender assembly being clamped to the second side edge of the door, and
first and second wheels, the first fender assembly including one or more struts supporting the first wheel, the second fender assembly including one or more struts supporting the second wheel.

Advantages, Features, Benefits

The different embodiments of the evacuation carts and kits described herein provide several advantages over known solutions for providing a cart for use in emergency purposes that can be stowed in a relatively small space when not in use. For example, the illustrative embodiments of carts and kits described herein allow a door to be converted into a cart. Additionally, and among other benefits, illustrative embodiments of the carts and kits described herein allow a cart to be created with a pair of wheels that were previously in use for another purpose besides a cart. No known system or device can perform these functions, particularly where the components of the conversion kit can be stowed in a volume much smaller than the evacuation cart. Thus, the illustrative embodiments described herein are particularly useful for carts to be used in an emergency situation. However, not all embodiments described herein provide the same advantages or the same degree of advantage.

Conclusion

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

I claim:

1. A kit for converting a door into a cart, the kit comprising:
a pair of wheel attachment assemblies, each wheel attachment assembly including:
a fender having a planar expanse with a first portion of the planar expanse configured to abut an under side of a door when the door is in a non-vertical orientation and a second portion of the planar expanse configured to extend beyond a lateral edge of the door;
a clamping member coupled to the fender, the clamping member having an upper portion configured to be coupled a top side of the door when the door is in a non-vertical orientation and a side portion configured to abut the lateral edge of the door;
an inner fork arm coupled to the first portion of the planar expanse of the fender;
an outer fork arm coupled to the second portion of the planar expanse of the fender;
an inner wheel attachment member coupled to the inner fork arm proximate a bottom end of the inner fork arm; and
an outer wheel attachment member coupled to the outer fork arm proximate a bottom end of the outer fork arm;
wherein a channel between the clamping member and the fender is sized to receive an edge portion of a door;
wherein the inner and outer wheel attachment members each include a first slot having an open end, the slot being configured to receive an axle of a bicycle wheel; and
wherein each of the inner and outer wheel attachment members further includes a second slot having an open end, the first and second slots having different widths and being configured to receive axles of different sizes.

2. The kit of claim 1, wherein the planar expanse of the fender of each of the pair of wheel attachment assemblies has a length in a range of one to three feet.

3. The kit of claim 1, wherein the clamping member of each of the pair of wheel attachment assemblies is an angle iron and the angle iron is coupled to the fender along a long edge of the angle iron.

4. The kit of claim 3, wherein the angle iron of each of the pair of wheel attachment assemblies has a length in a range of one to three feet.

5. The kit of claim 1, further comprising:
a handle attachment assembly including a handle clamp and a handle, the handle clamp configured to be coupled to an edge portion of the door and the handle configured to be coupled to the handle clamp.

6. The kit of claim 5, wherein the handle clamp includes a channel sized to receive an edge portion of the door.

7. The kit of claim 5, wherein the handle attachment assembly is one of a pair of handle attachment assemblies configured to be coupled to an edge portion of the door at spaced apart locations around the lateral edge of the door.

8. The kit of claim 1, further comprising a door having first and second side edges, the wheel attachment assemblies being attached to the first and second side edges of the door.

9. The kit of claim 8, wherein the first side edge of the door has holes for attaching door hinges.

10. The kit of claim 8, wherein the second side edge of the door has at least one hole for attaching a door handle.

11. A kit for converting a door into a cart, the kit comprising:
- a pair of wheel attachment assemblies, each wheel attachment assembly including:
  - a fender having a planar expanse with a first portion of the planar expanse configured to abut an under side of a door when the door is in a non-vertical orientation and a second portion of the planar expanse configured to extend beyond a lateral edge of the door;
  - a clamping member coupled to the fender, the clamping member having an upper portion configured to be coupled a top side of the door when the door is in a non-vertical orientation and a side portion configured to abut the lateral edge of the door;
  - an inner fork arm coupled to the first portion of the planar expanse of the fender;
  - an outer fork arm coupled to the second portion of the planar expanse of the fender;
  - an inner wheel attachment member coupled to the inner fork arm proximate a bottom end of the inner fork arm; and
  - an outer wheel attachment member coupled to the outer fork arm proximate a bottom end of the outer fork arm;
- wherein a channel between the clamping member and the fender is sized to receive an edge portion of a door;
- wherein the inner and outer wheel attachment members each include a first slot having an open end, the slot being configured to receive an axle of a bicycle wheel; and
- wherein each of the inner and outer wheel attachment members further includes at least one aperture for receiving a through-axle.

12. The kit of claim 11, wherein the planar expanse of the fender of each of the pair of wheel attachment assemblies has a length in a range of one to three feet.

13. The kit of claim 11, wherein the clamping member of each of the pair of wheel attachment assemblies is an angle iron and the angle iron is coupled to the fender along a long edge of the angle iron.

14. The kit of claim 13, wherein the angle iron of each of the pair of wheel attachment assemblies has a length in a range of one to three feet.

15. The kit of claim 11, further comprising:
- a handle attachment assembly including a handle clamp and a handle, the handle clamp configured to be coupled to an edge portion of the door and the handle configured to be coupled to the handle clamp.

16. The kit of claim 15, wherein the handle clamp includes a channel sized to receive an edge portion of the door.

17. The kit of claim 15, wherein the handle attachment assembly is one of a pair of handle attachment assemblies configured to be coupled to an edge portion of the door at spaced apart locations around the lateral edge of the door.

18. The kit of claim 11, further comprising a door having first and second side edges, the wheel attachment assemblies being attached to the first and second side edges of the door.

19. The kit of claim 18, wherein the first side edge of the door has holes for attaching door hinges.

20. The kit of claim 18, wherein the second side edge of the door has at least one hole for attaching a door handle.

* * * * *